US012568111B1

(12) United States Patent
Walch et al.

(10) Patent No.: US 12,568,111 B1
(45) Date of Patent: Mar. 3, 2026

(54) ASYNCHRONOUS CYBERSECURITY EVENT DETECTION PLATFORM

(71) Applicant: Target Brands, Inc., Minneapolis, MN (US)

(72) Inventors: Caleb Walch, Minneapolis, MN (US); Adam Kendall Tremarche, Worcester, MA (US); Anthony Lim, Chanhassan, MN (US)

(73) Assignee: Target Brands, Inc., Minneapolis, MN (US)

( * ) Notice: Subject to any disclaimer, the term of this patent is extended or adjusted under 35 U.S.C. 154(b) by 74 days.

(21) Appl. No.: 18/816,678

(22) Filed: Aug. 27, 2024

(51) Int. Cl.
| | |
|---|---|
| *G06F 21/00* | (2013.01) |
| *G06F 9/48* | (2006.01) |
| *H04L 9/40* | (2022.01) |

(52) U.S. Cl.
CPC ........ *H04L 63/1441* (2013.01); *G06F 9/4881* (2013.01); *H04L 63/1416* (2013.01); *H04L 63/1433* (2013.01)

(58) Field of Classification Search
CPC ............. H04L 63/1441; H04L 63/1416; H04L 63/1433; G06F 9/4881
See application file for complete search history.

(56) References Cited

U.S. PATENT DOCUMENTS

| | | | |
|---|---|---|---|
| 12,101,348 B2 * | 9/2024 | Peters | ................. H04L 63/1441 |
| 12,401,671 B1 * | 8/2025 | Ross | ................... H04L 63/1416 |

| | | | |
|---|---|---|---|
| 2015/0096027 A1 | 4/2015 | Romanenko et al. | |
| 2015/0222667 A1 | 8/2015 | Nayshtut et al. | |
| 2017/0013018 A1 | 1/2017 | Nakata et al. | |
| 2017/0126728 A1 | 5/2017 | Beam et al. | |
| 2018/0316703 A1 | 11/2018 | Mesic et al. | |
| 2019/0098068 A1 * | 3/2019 | Iliofotou | ............... H04L 67/535 |
| 2020/0244680 A1 | 7/2020 | Brandel et al. | |
| 2021/0112082 A1 | 4/2021 | Carlson et al. | |
| 2021/0117232 A1 * | 4/2021 | Sriharsha | ................ G06F 9/544 |
| 2022/0321606 A1 | 10/2022 | Hutelmyer et al. | |
| 2023/0114821 A1 * | 4/2023 | Thomas | ................ H04L 63/145 |
| | | | 726/23 |

* cited by examiner

*Primary Examiner* — Michael M Lee
(74) *Attorney, Agent, or Firm* — Barnes & Thornburg LLP

(57) ABSTRACT

In some implementations, a system is provided for asynchronously performing and monitoring cybersecurity investigations. A scheduler selects event detection jobs to be performed during a specified time interval, and provides the selected event detection jobs to an orchestrator. For each event detection job, the orchestrator executes a corresponding event detection job worker instance. Performing the event detection job includes querying at least one event data log for event data that represents events that have occurred over a specified time range, processing the event data to generate a detected security metric, and in response to the detected security metric meeting a threshold value, publishing a cybersecurity alert to a cybersecurity investigation result repository. A response system subscribes to the cybersecurity investigation result repository to identify cybersecurity alerts that have been published to the repository, and in response to identifying a cybersecurity alert, performs a security response.

18 Claims, 14 Drawing Sheets

<u>406</u>

Run: Job A

Start Time: 2024-03-15 16:06:00 UTC

End Time: 2024-03-15 16:16:00 UTC

Alerts: None

Status: IN PROGRESS

<u>404</u>

Run: Job A

Start Time: 2024-03-15 15:58:00 UTC

End Time: 2024-03-15 16:08:00 UTC

Alerts: None

Status: FAILED

<u>402</u>

Run: Job A

Start Time: 2024-03-15 15:50:00 UTC

End Time: 2024-03-15 16:00:00 UTC

Alerts: 1

Status: COMPLETE

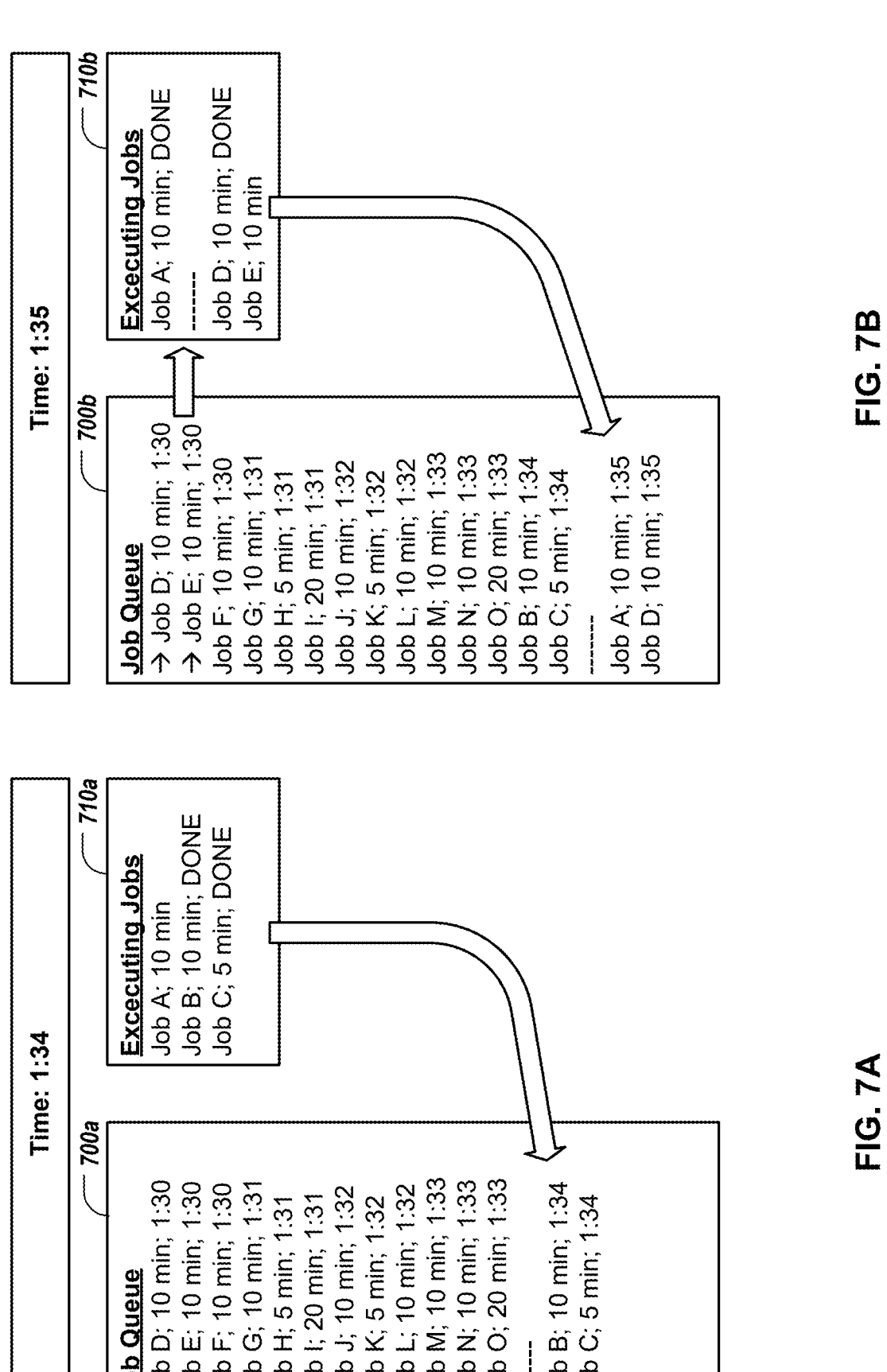

Time: 1:35

710b

Executing Jobs
Job A; 10 min; DONE
———
Job D; 10 min; DONE
Job E; 10 min

700b

Job Queue
→ Job D; 10 min; 1:30
→ Job E; 10 min; 1:30
Job F; 10 min; 1:30
Job G; 10 min; 1:31
Job H; 5 min; 1:31
Job I; 20 min; 1:31
Job J; 10 min; 1:32
Job K; 5 min; 1:32
Job L; 10 min; 1:32
Job M; 10 min; 1:33
Job N; 10 min; 1:33
Job O; 20 min; 1:33
Job B; 10 min; 1:34
Job C; 5 min; 1:34
———
Job A; 10 min; 1:35
Job D; 10 min; 1:35

FIG. 7B

Time: 1:34

710a

Executing Jobs
Job A; 10 min
Job B; 10 min; DONE
Job C; 5 min; DONE

700a

Job Queue
Job D; 10 min; 1:30
Job E; 10 min; 1:30
Job F; 10 min; 1:30
Job G; 10 min; 1:31
Job H; 5 min; 1:31
Job I; 20 min; 1:31
Job J; 10 min; 1:32
Job K; 5 min; 1:32
Job L; 10 min; 1:32
Job M; 10 min; 1:33
Job N; 10 min; 1:33
Job O; 20 min; 1:33
———
Job B; 10 min; 1:34
Job C; 5 min; 1:34

FIG. 7A

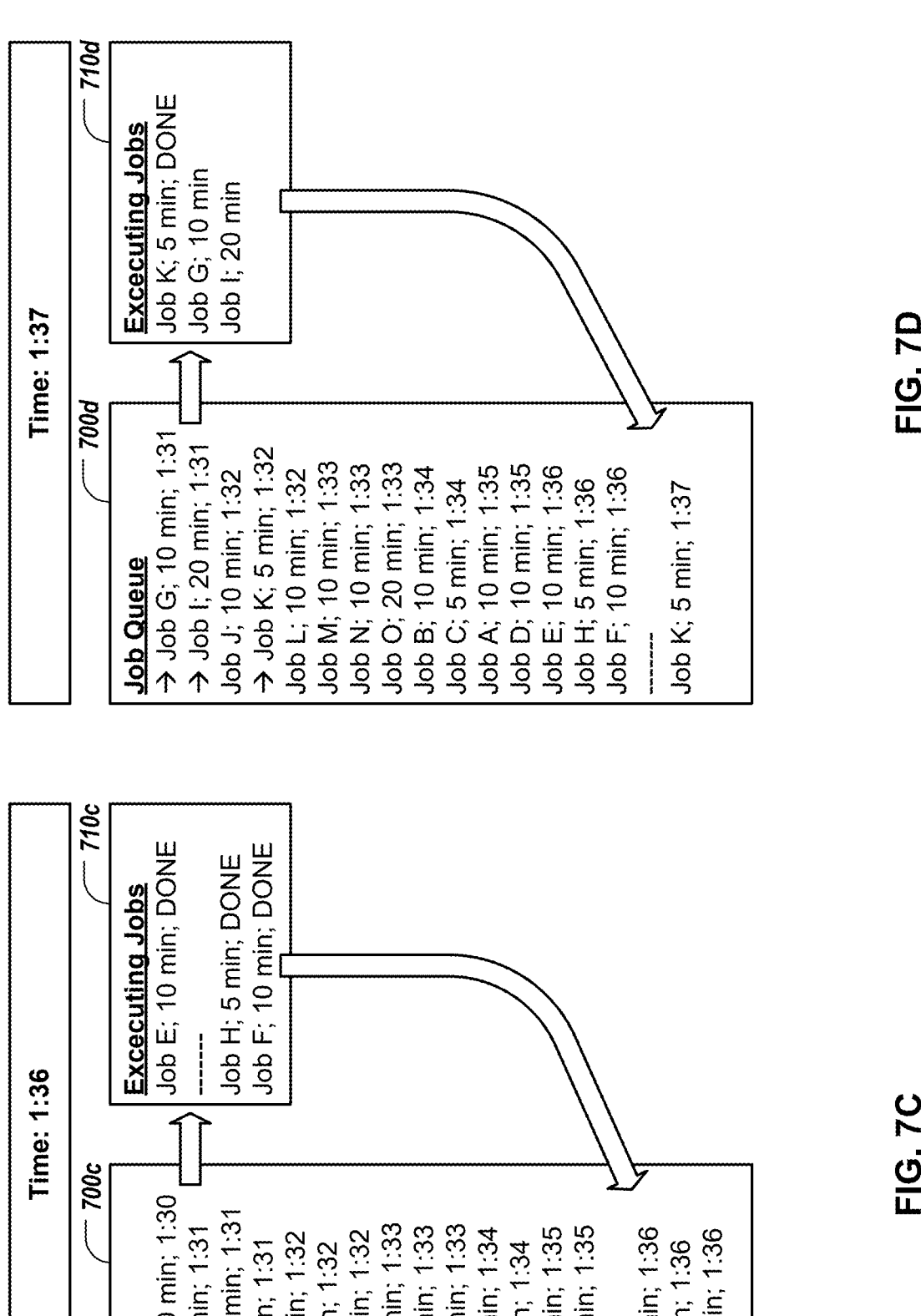

Time: 1:37

*710d*

Executing Jobs
Job K; 5 min; DONE
Job G; 10 min
Job I; 20 min

*700d*

Job Queue
→ Job G; 10 min; 1:31
→ Job I; 20 min; 1:31
Job J; 10 min; 1:32
→ Job K; 5 min; 1:32
Job L; 10 min; 1:32
Job M; 10 min; 1:33
Job N; 10 min; 1:33
Job O; 20 min; 1:33
Job B; 10 min; 1:34
Job C; 5 min; 1:34
Job A; 10 min; 1:35
Job D; 10 min; 1:35
Job E; 10 min; 1:36
Job H; 5 min; 1:36
Job F; 10 min; 1:36
_____
Job K; 5 min; 1:37

FIG. 7D

Time: 1:36

*710c*

Executing Jobs
Job E; 10 min; DONE
_____
Job H; 5 min; DONE
Job F; 10 min; DONE

*700c*

Job Queue
→ Job F; 10 min; 1:30
Job G; 10 min; 1:31
→ Job H; 5 min; 1:31
Job I; 20 min; 1:31
Job J; 10 min; 1:32
Job K; 5 min; 1:32
Job L; 10 min; 1:32
Job M; 10 min; 1:33
Job N; 10 min; 1:33
Job O; 20 min; 1:33
Job B; 10 min; 1:34
Job C; 5 min; 1:34
Job A; 10 min; 1:35
Job D; 10 min; 1:35
_____
Job E; 10 min; 1:36
Job H; 5 min; 1:36
Job F; 10 min; 1:36

FIG. 7C

ASYNCHRONOUS CYBERSECURITY EVENT DETECTION PLATFORM

TECHNICAL FIELD

This specification generally relates to a cybersecurity platform for performing asynchronous detection of cyber-security-related events, and responding to such events across a computer network.

BACKGROUND

Computer networks may be susceptible to various sorts of cybersecurity threats, such as denial of service attacks, spoofing, packet eavesdropping, and so forth. Network administrators can employ cybersecurity tools and protection systems in an attempt to mitigate such threats. Employment of cybersecurity tools and protection systems can generally involve creating rules for identifying the threats, and executing the rules on network traffic and other network and host-based security data.

SUMMARY

This document generally describes computer systems, processes, program products, and devices for performing asynchronous detection of cybersecurity-related events, and responding to such events across a computer network. In general, multiple different event data logs can be maintained by an organization, such as network traffic data logs, transaction data logs, physical sensor data logs, and so forth. Such event data can be continually appended to over time. Potential cybersecurity threats can be evidenced through patterns of event data that can be detected through the analysis of the data from a single log source, or a combination of event data from multiple different data log sources. As the techniques for accessing and processing data from different event data logs can be different, the cybersecurity event detection platform supports flexible mechanisms for defining, scheduling, and performing cybersecurity event detection jobs, and for acting upon security alerts that may result from such jobs.

To define a cybersecurity event detection job, a builder interface can be employed through which instructions for performing the job (e.g., including queries, parameters, commands, data operations, and/or application code) and scheduling parameters (e.g., frequency, time overlap, etc.) for use in determining when the job is due for execution. Over time, a scheduling component can select cybersecurity event detection jobs, and can provide the jobs to job worker instances for execution. Some jobs may include a single activity (e.g., accessing and processing log data from a single event data log), whereas other jobs may include multiple different activities (e.g., accessing processing log data from multiple different event data logs). An orchestration component can coordinate activities of a cybersecurity event detection job, including the delegation of activities to activity workers that execute the activities on computing devices that are configured to access data from the various event data logs. Detected security metrics can be generated based on results determined by the activity workers, and can be compared against predefined threshold values to determine whether any security alerts are to be triggered.

Data that results from the performance of a cybersecurity event detection job (including any alerts that may have resulted from the execution) can be posted to a repository. Other systems associated with the cybersecurity event detection platform can reference the resulting data, and can perform various actions. For example, reporting systems can provide visibility regarding the execution of event detection jobs, including the amount of time that was used for performing a job, whether the job involved any retries, whether the job failed or was successful, etc. As another example, the cybersecurity event detection system can reference the results data from previously performed event detection jobs when scheduling subsequent jobs. As another example, response systems can perform various mitigation jobs in response to alerts that were triggered by the cybersecurity event detection system.

In some implementations, a method for asynchronously performing and monitoring cybersecurity investigations includes selecting, by a scheduler and from a repository of cybersecurity event detection jobs, one or more selected event detection jobs to be performed during a specified time interval; providing, by the scheduler and to an orchestrator, the one or more selected event detection jobs; for each event detection job of the one or more event detection jobs, executing, by the orchestrator, a corresponding event detection job worker instance for performing the event detection job, where performing the event detection job includes: querying at least one event data log for event data that represents events that have occurred over a specified time range; processing the event data that results from querying the at least one data log to generate a detected security metric; comparing the detected security metric to a threshold security metric value; and in response to the detected security metric meeting the threshold security metric value, publishing a cybersecurity alert to a cybersecurity investigation result repository; subscribing, by a response system, to the cybersecurity investigation result repository, to identify cybersecurity alerts that have been published to the repository; and in response to identifying the cybersecurity alert that has been published to the cybersecurity investigation result repository, performing, by the response system, a security response.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. Event data can be continually appended to the at least one event data log, in response to events that occur over time. An operator interface can be provided for specifying instructions for performing the event detection job. A specification of instructions for performing the event detection job can be received through the operator interface. Job definition data that includes the specification of instructions for performing the event detection job can be provided, for storage by the repository of cybersecurity event detection jobs. The job definition data can be configured for processing a specific type of data from a specific event data log during performance of the event detection job, according to the specification of instructions for performing the event detection job. The job definition data can include job scheduling data that is configured for determining when to select and provide the event detection job to the orchestrator. The job scheduling data can include a frequency parameter, and the event detection job can be selected by the scheduler and provided to the orchestrator for another performance when a difference between a current time and a time at which a last performance of the event detection job occurred meets or exceeds the frequency parameter. While the event detection job is being performed by the event detection job worker instance, the orchestrator can receive current state information that indicates a current state of the event detection job. The current state information for the event detection job can be stored in an event detection status repository. The scheduler can access the current state information for the event detection job from the event detection results repository, for determining whether to select the event detection job for another performance. When the current state information indicates that the event detection job has failed, the scheduler can select the event detection job for another performance, over event data log data having timestamp values in a same time window as for a previous performance. When the current state information indicates that the event detection job has successfully completed, the scheduler can select the event detection job for another performance, over a time window that has a start time that precedes an end of time of the previous performance by a specified amount of time, such that the time window for the previous performance and a time window for the current performance partially overlap. When the current state information indicates that the event detection job has successfully completed, the event detection job can be added to the end of a rotating queue of cybersecurity event detection jobs. Selecting one or more selected event detection jobs can includes selecting the one or more selected event detection jobs from the front of the rotating queue of cybersecurity event detection jobs, and adding the one or more selected event detection jobs to a batch of event detection jobs. Providing the one or more selected event detection jobs can include providing the batch of event detection jobs. Comparing the detected security metric to the threshold security metric can include aggregating the event data that results from querying the at least one data log over a series of time windows, with each time window in the series of time windows having a same time interval within the specified time range. The event detection job can include a plurality of different activities, each activity involving a querying of a different event data log by a different activity worker to determine a respective activity result. The event detection job worker instance can process the respective activity results to generate the detected security metric.

The systems, devices, program products, and processes described throughout this document can, in some instances, provide one or more of the following advantages. A timely processing of recently collected log data across disparate systems can be facilitated. The processing of log data can be dynamically adjusted to optimize the use of computing resources. A series of specified time windows for detecting cybersecurity events can overlap, thereby facilitating event detection for instances in which a specified time interval is relatively long and/or event occurrences are relatively sporadic. Multiple retries for executing a job/activity can be performed to improve the robustness of the cybersecurity event detection platform. Multi-factor cybersecurity events can be detected by analyzing data across disparate data sources. A flexible approach to cybersecurity event detection job scheduling can be employed to maximize the use of processing resources. By asynchronously performing event detection and security response operations, components of the event detection platform can be loosely coupled, thus improving system robustness and recovery from possible crashes and network outages. Further, recent event log data can be queried and analyzed on an ad hoc basis (as opposed to explicitly tracking event counts as they occur), thus improving system performance, and enabling retroactive job execution. Moreover, the security response actions can also be performed in a flexible manner.

Other features, aspects and potential advantages will be apparent from the accompanying description and figures.

DESCRIPTION OF DRAWINGS

FIG. 4 depicts an example execution log that results from detecting cybersecurity-related events.

FIGS. 7A-7F depict an example scenario for selecting and executing cybersecurity event detection jobs using a rotating queue.

Like reference symbols in the various drawings indicate like elements.

DETAILED DESCRIPTION

This document describes technology that can perform asynchronous detection of cybersecurity-related events, and can respond to such events across a computer network. In general, an organization can maintain multiple different event data logs, which can be continually appended to over time. A builder interface can be provided for defining various cybersecurity event detection jobs that are to be repeatedly executed against data from the event data logs. A scheduling component can select from a pool of defined cybersecurity event detection jobs, and can provide selected jobs to an orchestration component for execution of the jobs. The orchestration component can delegate activities included in a cybersecurity event detection job to various workers for execution. Data that results from the execution of the jobs can be posted to a results repository that can be accessed by various systems to provide visibility into event detection processes, to facilitate scheduling of subsequent performances of the jobs, and to respond to alerts that may result from the executions of the jobs.

Figure 1:
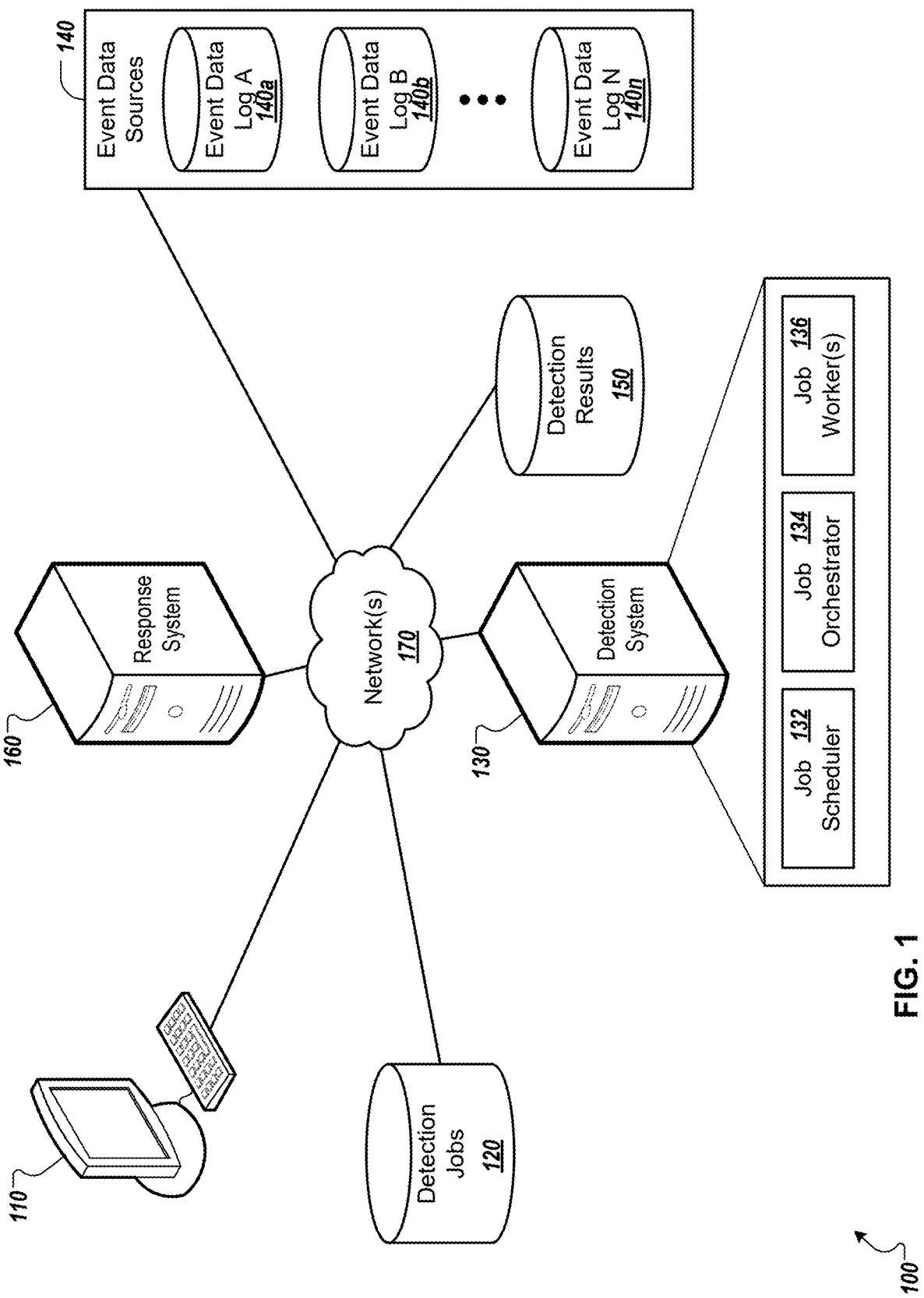
FIG. 1 depicts an example system for performing asynchronous detection of cybersecurity-related events.

FIG. 1 depicts an example system 100 for performing asynchronous detection of cybersecurity-related events. In general, the system 100 can include various computing devices, computing server systems, and data stores, configured to communicate with each other over one or more networks. For example, the system 100 can include a client computing device 110, a cybersecurity event detection jobs data repository 120, a detection system 130, one or more event data sources 140, a detection results data repository 150, and a response system 160, that can communicate and exchange data over network(s) 170 (e.g., including one or more LANs (local area networks), WANs (wide area networks), and/or the Internet).

The client computing device 110, for example, can represent various forms of stationary or mobile computing devices including, but not limited to a desktop computer, a laptop computer, a tablet computer, a personal digital assistant (PDA), a smartphone, or other processing devices. In general, the client computing device 110 can be used to generate definition data for cybersecurity event detection jobs to be performed by the detection system 130. Further, the client computing device 110 can potentially be used to monitor the status of the cybersecurity event detection in real-time as the jobs are being performed, and to present information related to the results of performed jobs (e.g., including resulting alert information). The client computing device 100, for example, can include various input devices (e.g., keyboard, mouse, pointer, touchscreen, microphone, etc.) for receiving input from a device operator, and various output devices (e.g., display, printer, speaker, etc.) for presenting output to the device operator.

The cybersecurity event detection jobs data repository 120, for example, can represent one or more databases, file systems, and/or cached data sources. In general, the detection jobs data repository 120 can be used to maintain job definition data generated by the client computing device 110, and can provide the detection system 130 with access to maintained job definition data. For each defined cybersecurity event detection job, for example, the detection jobs data repository 120 can include various instructions (e.g., including queries, parameters, commands, and/or executable computer code) for performing the cybersecurity event detection job.

The detection system 130, for example, can represent various forms of servers, including but not limited to network servers, web servers, application servers, or other suitable computing servers. In general, the detection system 130 can access job definition data maintained by the detection jobs data repository 130, and can execute instructions for performing various cybersecurity event detection jobs. To perform the cybersecurity event detection jobs, for example, the detection system 130 can include various software components (e.g., applications, modules, objects, or other suitable software components), which may be combined or separate, and may be co-located (e.g., executed by a same server) or distributed (e.g., executed by different servers). In the present example, the detection system 130 can include a job scheduler 132, a job orchestrator 134, and one or more job workers 136. In general, the job scheduler 132 can perform operations for triggering the performance of a cybersecurity event detection job (e.g., based on predefined schedule data for the job), the job orchestrator 134 can delegate the cybersecurity event detection job to one or more available workers and can track and report on a current job status, and the job worker(s) 136 (e.g., computer software components that are executed by the detection system 130 and/or other computing systems) can execute the delegated cybersecurity event detection job or portions of the job.

The event data sources 140 can include one or more event data logs (e.g., event data log 140a, event data log 140b, event data log 140n, etc.). Each of the event data logs 140a-n, for example, can represent one or more databases, file systems, and/or cached data sources. The job worker(s) 136 can be configured to access the event data sources 140, for example, and to perform operations based on the accessed data. In general, data maintained by the data logs 140a-n can include data that is continually collected and that is appended to the data logs 140a-n in real-time, as the data is being collected. Further, each of the data logs 140a-n can represent a data log from a different data collection system and/or a different type of data. For example, a first event data log can include network traffic data for various computing nodes across an enterprise's computer network, a second event data log can include transaction data that represents purchases conducted across various accounts, a third event data log can include sensor data (e.g., badge scan data, data based on image sensors, etc.) that represents actions that occurred in a physical environment, and so forth. Each of the data logs 140a-n, for example, can include a vast amount of data (e.g., terabytes, petabytes), which may or may not be perpetually maintained. For example, some data logs can be periodically purged or archived, with only a most recent portion of the data (e.g., data collected within the current hour, day, week, or another suitable time period) being maintained or readily accessible. Further, each of the data logs 140a-n may be maintained by a different data repository system, and thus may be accessible using different data access techniques employed by various different job workers 136. Thus, the technology described herein can facilitate a timely processing of recently collected log data across disparate systems.

The detection results data repository 150, for example, can represent one or more databases, file systems, and/or cached data sources. In general, the detection results data repository 150 can be used to maintain results data (e.g., general results, statuses, alerts, etc.) based on the processing of the data from the event data sources 140. For example, as a cybersecurity event detection job is being executed by one or more job workers 136, the detection results data repository 150 can be updated in real-time with results data that corresponds to the execution of the job. In the present example, a single detection results data repository 150 is shown, however in other examples, multiple different data repositories can be provided for maintaining different types of results data. For example, a first data repository can be provided for maintaining general results (e.g., reporting data values that are based on the execution of one or more queries on one or more of the event data sources 140), a second data repository can be provided for maintaining job execution statuses (e.g., a current status of a cybersecurity event detection job), a third data repository can be provided for maintaining alerts (e.g., an alert that is generated based on one or more data values that result from the execution of a cybersecurity event detection job), and so forth.

The response system 160, for example, can represent various forms of servers, including but not limited to network servers, web servers, application servers, or other suitable computing servers. In general, the response system 160 can be configured to perform one or more mitigation actions in response to an alert being added to the detection results data repository 150. Mitigation actions, for example, can include blocking network traffic from a malicious computing node, performing malware removal operations on infected computing nodes, notifying system users about malicious activities, or other appropriate actions.

Referring now to FIGS. 2A-2D, an example illustrative process is shown for performing asynchronous detection of cybersecurity-related events, as represented in example stages (A) to (J). Stages (A) to (J) may occur in the illustrated sequence, or they may occur in a sequence that is different than in the illustrated sequence, and/or two or more stages (A) to (J) may be concurrent. In some examples, one or more stages (A) to (J) may be repeated multiple times when performing asynchronous detection of cybersecurity-related events, when reporting such events, and/or when performing responses to such events.

Figure 2A:
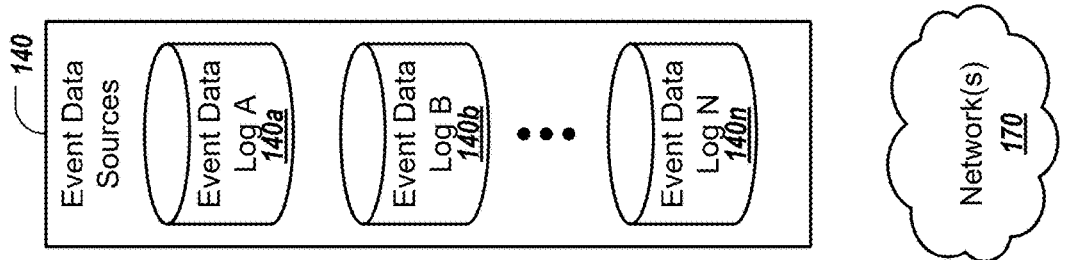
FIGS. 2A-2D depict an example illustrative process for performing asynchronous detection of cybersecurity-related events.
Figure 2A:
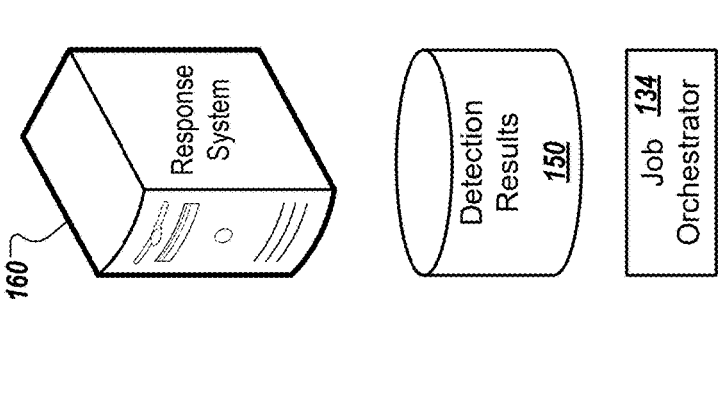
Figure 2A:
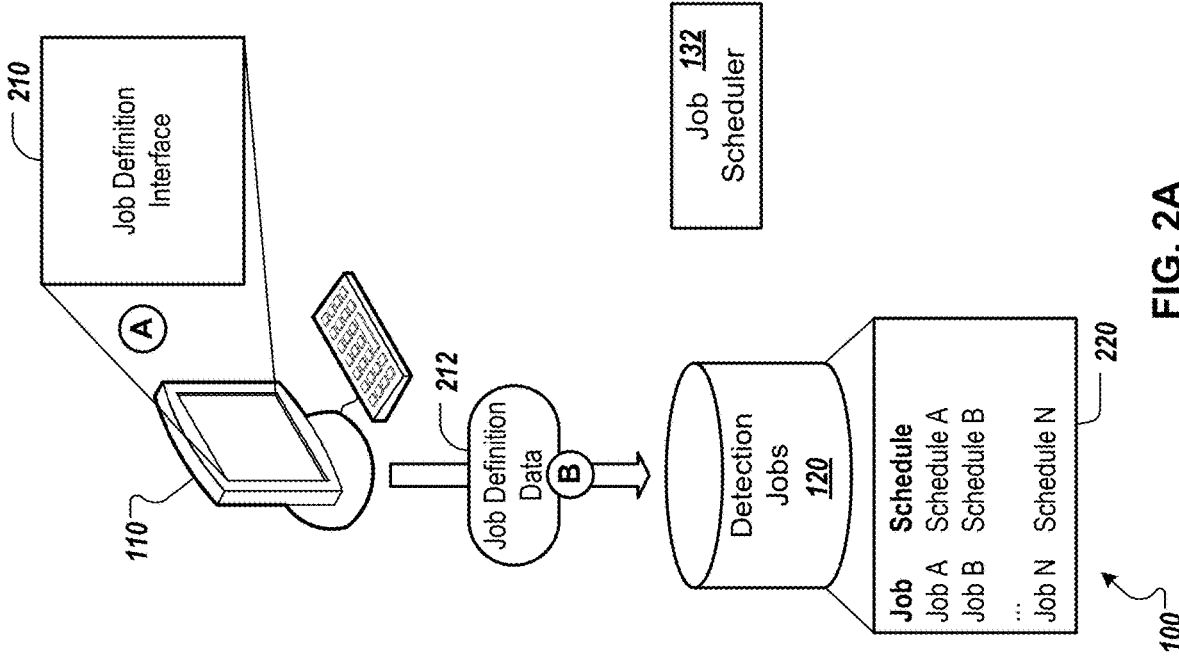

Referring to FIG. 2A, during stage (A), the client computing device 110 can present a job definition interface 210. An operator of the client computing device 110, for example, can use the job definition interface 210 to define a cybersecurity event detection job to be performed by the detection system 130, including various instructions (e.g., queries, parameters, commands, and/or executable computer code) for performing the cybersecurity event detection job. In some implementations, a job definition interface can include a computer code editor to facilitate the generation of executable computer code for performing a cybersecurity event detection job. For example, the job definition interface 210 can include a source code editor for a programming language (e.g., Python, Java, .NET, or another suitable programming language) that can reference various application programming interfaces (APIs) that are configured to perform various activities of a defined cybersecurity event detection job, including accessing particular event data sources 140, querying data included in the event data sources, performing operations on data that results from the queries (e.g., aggregation, frequency, matching, etc.), and other sorts of activities. In some implementations, a job interface can include various controls that can receive input for defining a cybersecurity event detection job (and/or an activity included in a detection job). For example, the job definition interface 210 can include a set of controls for defining the cybersecurity event detection job (and/or activity), which can be interacted with by an operator of the interface. In some implementations, a job interface can include a hybrid of job/activity definition controls and programming language editing controls for modifying rules and/or source code.

Figure 3:
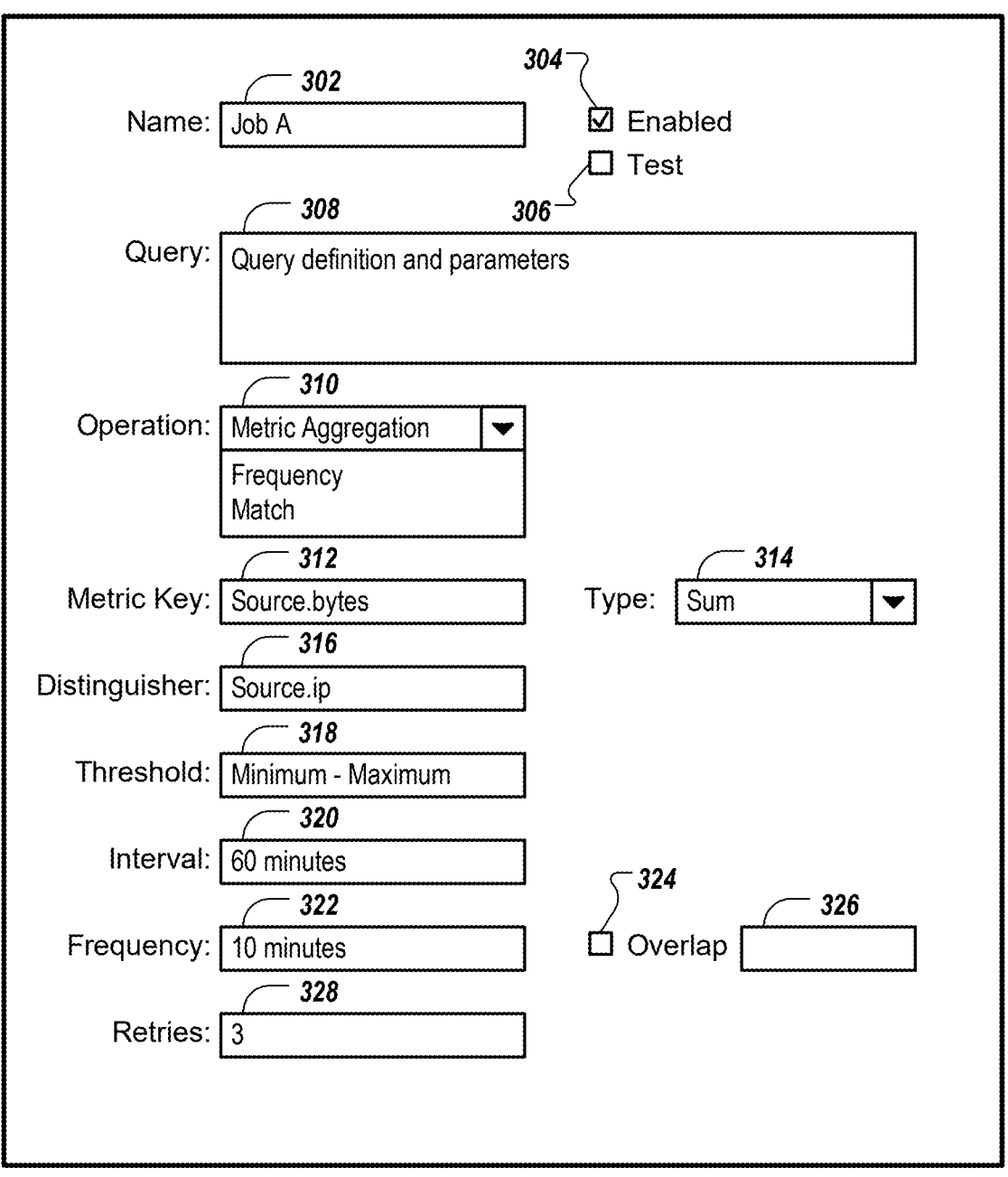
FIG. 3 depicts an example interface for providing cybersecurity event detection definition data.

Referring now to FIG. 3, an example interface 300 is shown for providing cybersecurity event detection definition data. For example, an operator of the interface 300 can interact with various controls included in the interface 300 to specify various parameters for performing a cybersecurity event detection job (and/or one or more activities included in the detection job). In the present example, the controls include a control 302 for specifying an identifier for the job (e.g., a name, "Job A"), a control 304 for indicating whether the job is to be presently enabled, and a control 306 for indicated whether the job is a test job (e.g., is currently under development).

In some implementations, an interface for defining a cybersecurity job (and/or job activity) can include various controls for specifying queries and query operations for the job/activity. Continuing with the present example, the interface 300 includes a query definition control 308 that can be used to provide query syntax and parameters for executing a query on one of the event data sources 140. Further, the interface 300 in the present example includes an operation control 310 for specification of a type of operation to be performed on the data retrieved via the defined query. In general, operation types can include metric aggregation, frequency, match, and other suitable types of operations. A metric aggregation operation, for example, can include creating buckets of like values for a particular metric key (e.g., specified using control 312), and performing a specified type of data aggregation (e.g., specified using control 314) on the like values for a specified distinguisher (e.g., specified using control 316). In the present example, the specified metric aggregation includes performing a sum of values for the "source. bytes" metric key for the "source.ip" distinguisher (e.g., with the result indicating an amount of data traffic that originates from each source of a set of sources) over time. A frequency operation, for example, can include determining a count of occurrences of a particular event represented in a data log over time. A match operation, for example, can include identifying a data match of a particular event represented in a data log over time.

In some implementations, an interface for defining a cybersecurity job (and/or job activity) can include one or more controls for specifying threshold values for triggering alerts based on metric values resulting from an execution of the job/activity. Continuing with the present example, the interface 300 also includes a threshold control 318 through which an operator of the interface 300 can specify a minimum value, a maximum value, or a range of threshold values for which an alert is to be generated in response to the threshold value(s) meeting a detected metric value (e.g., a value generated when executing the specified query using the specified query parameters and specified type of operation). In the present example, if a number of "source.bytes" that has originated from a given "source.ip" over a specified time range meets a specified threshold value (e.g., 25 GB, 50 GB, 100 GB, or another suitable value), an alert is to be generated by a worker that performs the cybersecurity job/activity.

In some implementations, an interface for defining a cybersecurity job (and/or job activity) can include various controls for specifying various query and command parameters for indicating temporal aspects of executing the job/activity. Continuing with the present example, the interface 300 includes an interval control 320 through which an operator of the interface can specify a time range over which query results are to be determined. In general, each record in a data log can be associated with a timestamp value that indicates when the record was created, and querying records in the data log can include specifying a time range over which query results are to be returned. In the present example, when the specified query is executed, data records from the data log can be returned that have a timestamp value that falls within a range defined by a given start time and end time for the query (e.g., query parameters that pertain to the data records from the data log and not necessarily to when the query is executed), separated by the specified time interval (e.g., 60 minutes, or another suitable interval). The specified operations can then be performed over the returned set of records to determine one or more metric values, and the specified threshold value(s) can be compared to the determined metric value(s). Further, the interface 300 in the present example includes a frequency control 322 through which an operator of the interface 300 can specify a frequency (e.g., every 10 minutes, or another suitable frequency) at which the job/activity is to be executed.

It will be appreciated that for instances in which a cybersecurity event detection job's specified frequency is less than the job's specified interval, subsequent executions of the job will occur over data in a data log according to a series of overlapping time windows. However, if a job's interval matches its frequency, the series of time windows may not necessarily overlap. If overlap of sequential executions of the job/activity are desired, for example, an operator can specify such through an overlap control 324, and can also specify an amount of time (e.g., one minute, two minutes, five minutes, or another suitable amount of time) for the overlap through an overlap time value control 326. For a first execution of a job/activity, for example, a start time and an end time can be separated by a specified time interval, with the returned event log records falling within the interval between the start time and the end time. For a second execution of the job/activity, for example, the start time can be either be increased by the frequency time value (e.g., when no overlap is indicated), or by an amount of time that is less than the frequency time value by the specified overlap time value (e.g., when an overlap is indicated).

As a result of applying the query and command parameters, the specified metric threshold value(s) can be compared against a series of determined metric values, for each of a series of consecutive time windows that either do not overlap, or that do overlap according to the specified overlap time value. In general, specifying an overlap value can be beneficial in instances when a specified time interval is relatively long and/or event occurrences are relatively sporadic. For example, if a cluster of event occurrences were to occur across a border between two adjacent time intervals, running a detection job/activity over overlapping time windows may detect the occurrence of a cybersecurity event that is based on a metric aggregation or frequency operation, whereas running the detection job/activity over non-overlapping time windows may or may not detect the occurrence of the cybersecurity event.

In some implementations, an interface for defining a cybersecurity job (and/or job activity) can include one or more controls for specifying a number of retries for executing the job/activity. Continuing with the present example, the interface 300 incudes a retry control 328 through which an operator of the interface can specify a number or retries (e.g., 1, 2, 3, or another suitable number or retries) that are to be performed. For example, if an initial attempt at executing the job/activity were to fail (e.g., due to a worker failure, a network outage, a timeout condition, or another occurrence), one or more additional attempts can be made to execute the job/activity, until the specified number of retries have been performed. Performing additional retries for executing a job/activity, for example, can improve the reliability of the cybersecurity event detection platform against unexpected outages or failures.

Although the interface 300 shown in the present example shows the definition of a single job (e.g., "Job A") that involves a single activity (e.g., a metric aggregation operation based on specified queries, parameters, and commands) intended for execution over log data retrieved from a single data source (e.g., one of the event data sources 140a-n), in other examples, a job definition interface can be used to define a more complicated cybersecurity event detection job that involves multiple different activities, with each activity being executed over a same data source, or being executed over different data sources. For example, a multiple activity cybersecurity event detection job can involve a first activity that involves executing a first operation over a first data source (e.g., event data log 140a), a second activity that involves executing a second operation over a second data source (e.g., event data log 140b), a third activity that involves executing a third operation over a third data source (e.g., even data log 140c), and so forth.

In general, a multiple activity cybersecurity event detection job can include low-level instructions for performing each of the activities, and high-level instructions for performing an overall job, that can include processing the results generated by each of the activities to determine an overall result. An interface for defining the multiple activity cybersecurity event detection job, for example, can include an overall job definition interface that facilitates the inclusion of multiple different activities to the overall job (e.g., with each activity being defined through a respective activity definition interface similar to the interface 300), and with the overall job interface specifying high-level instructions for processing the results generated by each of the activities. The overall job interface, for example, can include job definition controls for specifying how activity results data is to be processed/analyzed, and/or a code editor to facilitate the generation of computer code for performing the overall job. Thus, the cybersecurity event detection platform can be used to detect multi-factor cybersecurity events that are evidenced through the processing and analysis of event data across disparate data sources.

Referring again to FIG. 2A, during stage (B), job definition data 212 generated by the client computing device 110 through input provided via the job definition interface 210 can be transmitted to the detection jobs repository 120. In general, for a defined cybersecurity event detection job, the job definition data 212 can include job instruction data that specifies how the job is to be performed (e.g., queries, parameters, and/or executable computer code for each of one or more job activities), and job scheduling data that specifies when the job is be performed (e.g., command parameters for indicating temporal aspects of executing the job/activity, including a frequency and optional time overlap for performing an overall job, and including optional retry parameters for each of one or more job activities of the overall job). The job definition data 212, for example, can be maintained within a set 220 of defined detection jobs, as a collection of specified queries, parameters, and commands, as executable code, or as a hybrid of specified queries, parameters, and commands, and executable code.

Figure 2B:
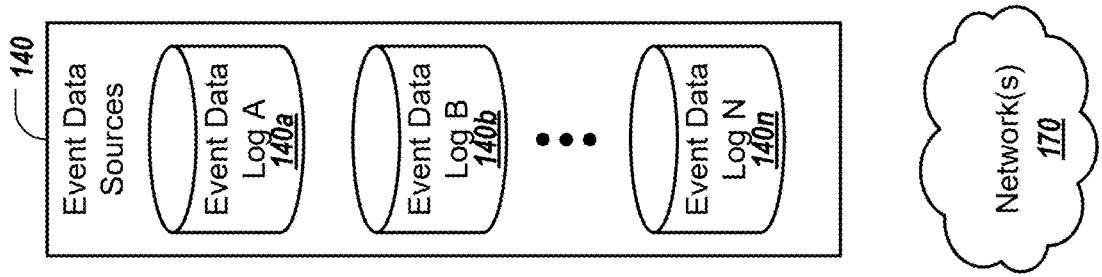

Referring now to FIG. 2B, during stage (C), the job scheduler 132 can select one or more detection jobs from the set 220 of defined detection jobs (e.g., job(s) 230a, which represent a single job, or a batch of jobs that are provided at a scheduling interval), and can provide the selected job(s) to the job orchestrator 134. In general, selection of cybersecurity event detection job(s) can be based at least in part on job scheduling data and at least in part on job execution log data associated with the job(s). For example, the job scheduler 132 can access and/or maintain the job execution log data (e.g., data that is added to the detection results repository 150 as a result of jobs being executed), to determine when jobs have been executed in the past, and the statuses of such job executions (e.g., in progress, completed, failed, etc.). The job scheduler 132, for example, can determine when a job is due for another execution, based on the job execution log, the scheduling data, and optionally, on processing capabilities of the detection system 130.

In the present example, the job scheduler 132 can compare the job execution log data that pertains to past executions of a job, to the job's scheduling data (e.g., a defined frequency and optional time overlap for the job) to determine whether the job is currently due for another execution. For example, if a previous successful execution of a cybersecurity event detection job occurred ten minutes ago, and the job's defined frequency and interval are ten minutes (with no overlap), the job can be due for another execution. In the present example, the job can be selected for another execution, with the job's start time being set to match the previous job execution's end time, and with the job's end time being set to the start time plus ten minutes, per the job's interval. As an alternate example, if the cybersecurity event detection job were to have a defined frequency and interval of ten minutes with a two minute overlap, the job can be due for another execution eight minutes after a previously successful execution of the job. In the alternate example, for a current execution of the job, the job's start time can be set to two minutes before the previous job execution's end time, and with the job's end time being set to the start time plus ten minutes (per the defined interval), such that the previous execution and the current execution of the job are executed over event log data time windows that overlap by two minutes. Thus, in the alternate example, if a spike of event log data happened to occur in a block of time that spanned the previous job execution's end time (e.g., with some events occurring before the job execution's end time, and with some events occurring after the end time), a cybersecurity event that corresponds to the spike of event log data can be detected during the subsequent execution's run, whereas the cybersecurity event could possibly evade detection if non-overlapping time windows were to be used.

As the cybersecurity event detection jobs are executed on previously collected event log data over specified time ranges, the cybersecurity event detection platform can generally employ some flexibility in which cybersecurity event detection jobs are scheduled and executed. In general, it may be preferable to execute jobs over data that is as recent as possible, in order to potentially detect cybersecurity events as they occur, or soon afterwards. However, if a job execution processor were to be at capacity (e.g., based on a target number of event detection jobs that are to be concurrently processed by the event detection system 130), it may be acceptable to delay the execution of lower-priority cybersecurity event detection jobs, while higher-priority jobs are given precedence. For example, the job detection system 130 can track a number of event detection jobs currently being performed, and can throttle the scheduling/performance of additional jobs such that the number currently performed jobs substantially matches the target number of jobs. In the present example, as jobs are due to be executed, the higher-priority jobs can be run immediately when due (e.g., with an end time of a specified time window for the higher-priority jobs being close to a current time), and the lower-priority jobs can be scheduled and placed in a queue for execution later. As processing resources of the cybersecurity event detection platform become available (e.g., through load balancing and/or job scheduling adjustments), the lower-priority jobs can be removed from the queue (e.g., in a first in, first out arrangement) and can be executed over data windows with end times that are somewhat less recent than a current time, but still in an acceptable time range. Job priorities, for example, can be specified through priority indicators (or another suitable mechanism) that are assigned by an operator when defining job execution data for the cybersecurity event detection job.

As an alternate example, specified job frequency values can be employed by the cybersecurity event detection platform as minimum scheduling guidelines, with a job potentially being executed more frequently than indicated by the specified job frequency value if the system were determined to have additional capacity for executing jobs (e.g., based on a target number of event detection jobs that are to be concurrently processed by the event detection system 130). In the alternate example, the effect can be that all jobs are executed more frequently and with overlapping time windows when processing resources are available, and less frequently (and possibly with some jobs having non-overlapping time windows unless otherwise specified) when processing resources are constrained. By employing a flexible approach to job scheduling, for example, the cybersecurity platform can maximize its use of processing resources to potentially detect cybersecurity events sooner than would be possible if strict job scheduling procedures were to be employed.

Figure 2C:
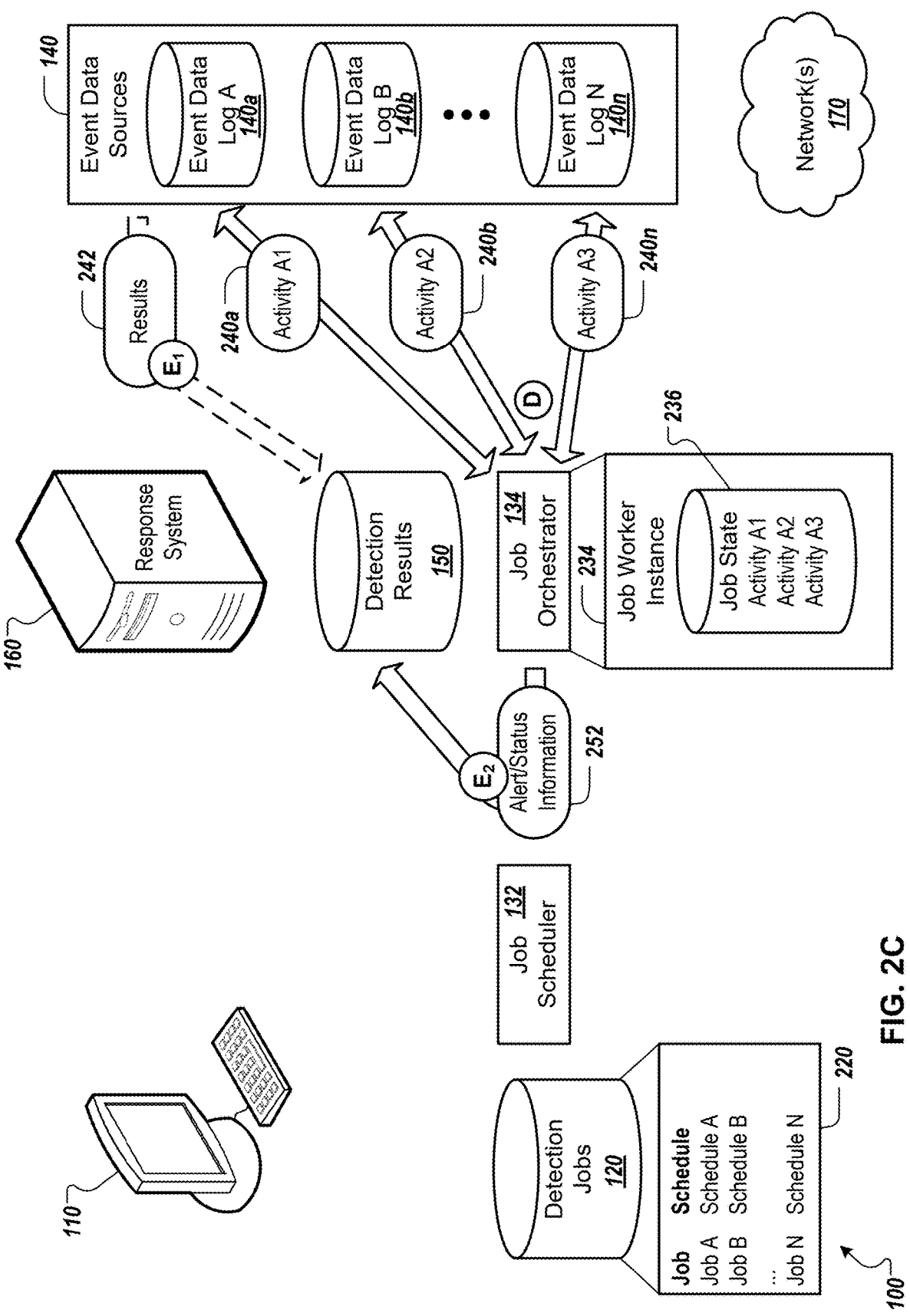

Referring now to FIG. 2C, during stage (D), the job orchestrator 134 can coordinate the execution of one or more activities of a cybersecurity event detection job. For example, upon receiving instruction data for the job(s) 230a (e.g., a single job, or a batch of jobs provided according to a batch time interval) from the job scheduler 132 (e.g., as shown in FIG. 2B, during stage (C)), the job orchestrator 134 can initiate a separate job worker instance (e.g., job worker instance 234) for each of the jobs. In general, a job worker instance can be configured to process job instruction data that is associated with a cybersecurity job. For example, the job worker instance 234 can be configured to execute source code included in the job instruction data. As another example, the job worker instance 234 can include an interpreter that is configured to operate on various commands and parameters included in the job instruction data. As another example, the job worker instance 234 can execute computer code and can also operate on various commands and parameters.

In the present example, the job worker instance 234 can maintain job state data 236 for each activity included in a cybersecurity event detection job (e.g., Activity A1, Activity A2, and Activity A3). The job state data 236, for example, can represent a progress and current status of each activity, and can be persisted to facilitate the reporting of a status of an overall job, and to facilitate job recovery operations in the event that the overall job fails during execution. For example, if the job worker instance 234 were to crash before completing a cybersecurity event detection job, the job orchestrator 134 can initiate a new job worker instance, and the new job worker instance can use the job state data 236 to determine a previous overall job state of a partially executed cybersecurity event detection job, and to resume operations at a previous point of failure. As another example, if an activity included in a cybersecurity event detection job were to fail, the job worker instance can update the job state data 236 for the activity, and can potentially initiate a retry (e.g., based on a specified retry parameter for the activity), and can increment a retry count for the activity.

In general, a job worker instance (e.g., job worker instance 234) managed by the job orchestrator 134 can be executed by the detection system 130 (e.g., shown in FIG. 1), and can perform high-level operations for performing an overall cybersecurity event detection job, including performing operations over each of the results determined by each of one or more activities included in the job. The activities, for example, can include low-level operations (e.g., querying an event data log according to a specified query and query parameters included in job instruction data for the cybersecurity event detection job, performing aggregation, frequency, and/or matching operations on data that results from the specified query, etc.), and are generally performed by computing devices that are remote from the detection system 130. In the present example, for each of the event data logs 140a-n, activities that involve event data maintained by the respective data log can be performed by a respective computing device that provides access to the respective data log. Each respective computing device, for example, can be configured to perform a specified activity according to low-level activity instructions included in the job instructions data for the cybersecurity event detection job. The activity instructions, for example, can include computer code (e.g., to be directly executed), various commands and parameters (e.g., to be interpreted by an execution engine), or a hybrid of computer code, commands, and parameters. Execution of the activity instructions, for example, can include providing the activity instructions to an activity worker instance running on the computing device that is configured to interface with the event data log for which the instructions are intended.

Relatively simple cybersecurity event detection jobs can generally involve the performance of a single low-level activity (e.g., a data retrieval operation performed by an activity worker over a single event data source), whereas more complicated cybersecurity event detection jobs can involve the performance of multiple different low-level activities (e.g., data retrieval operations performed by multiple different activity workers over multiple different event data sources), and a high-level operation (e.g., performed by an overall job worker) that includes processing the results generated by each of the activity workers to determine an overall result that can potentially trigger a cybersecurity event alert. In the present example, a more complicated cybersecurity event detection job is shown, in which the job orchestrator 134 transmits activity instructions 240a for execution by activity worker A1 over log data maintained by event data log 140a, activity instructions 240b for execution by activity worker A2 over log data maintained by event data log 140b, and activity instructions 240n for execution by activity worker A3 over log data maintained by event data log 140n. For example, event data log 140a can represent a network traffic data log that identifies network traffic to and from various network nodes, event data log 140b can represent a transaction data log that tracks purchases made from various accounts, and event data log 140n can represent a building access data log that tracks badge scans in a building. An operator of the cybersecurity event detection platform, for example, can identify a pattern of events (e.g., via a machine learning platform or another sort of analysis) that involves data across each of the three data logs 140a, 140b, 140n, such as a scenario that involves network traffic being received by a network node from a particular internet protocol (IP) address (e.g., as evidenced by data log 140a), and a purchase being made by a designated operator of the network node (e.g., as evidenced by data log 140b), while the designated operator is not located in the building in which the network node is located (e.g., as evidenced by data log 140n). Detecting an occurrence of such a scenario over time can be challenging, as a vast amount of data maintained by disparate data sources is to be repeatedly accessed and analyzed to detect the occurrence.

Continuing with the present example, each of the activity workers (e.g., activity workers A1, A2, and A3) tasked with a portion of the overall cybersecurity event detection job can independently and concurrently perform their portion of the overall job. When activity results are determined by each of the individual activity workers (e.g., by calling application programming interfaces (APIs), executing computer code, executing queries, etc.), for example, the activity results can be returned to the job worker instance 234 and/or can be provided by the activity workers to the detection results repository 150. For relatively simple cybersecurity event detection jobs in which a single activity is to be performed over a single data source, for example, an activity worker can optionally transmit its execution results (e.g., results 242) directly to the detection results repository 150 (e.g., as shown in stage (E₁)). As another example, for more complicated cybersecurity event detection jobs in which multiple activities are performed over multiple data sources, each of the activity workers can independently transmit their execution results to the detection results repository 150, and the job worker instance 234 can retrieve the results (e.g., through a subscription mechanism, polling mechanism, or another suitable data retrieval mechanism). As another example, for more complicated cybersecurity event detection jobs, each of the activity workers can transmit their execution results directly to the job worker instance 234.

As the activity workers perform their delegated activities and as activity execution results are determined by the activity workers, a job worker instance can track a current state of each of the activities, and an overall status of the job. For example, once each of the activity workers A1, A2, and A3 have successfully executed their respective activities over the respective event data logs 140a, 140b, and 140n, the job worker instance can update the job state data 236 to indicate that the respective activities have been completed, and can determine an overall job result based on the respective component results for each activity (e.g., either directly provided to the job worker instance 234 by the activity workers, or retrieved by the job worker instance 234 via the detection results repository 150). As another example, if an activity worker has failed, the job worker instance can initiate an attempted retry for the activity until a specified activity retry count for the activity has been reached.

During stage (E₂), the job orchestrator 134 can transmit alert/status information 252 for the detection results repository 150. For example, the job worker instance 234 can provide a status of the overall job (e.g., whether the job is in progress, has completed, or has failed) as the job is being executed, and when the job has finished. When a job is initiated, for example, the job status can initially be set to "in progress," and the job status can remain "in progress" until such time that the job has failed (e.g., with the specified number of retries being exhausted) or has successfully been completed. When the job has failed or has successfully been completed, for example, the job status can be updated to reflect the appropriate status. For successfully completed cybersecurity event detection jobs, for example, the component results for each activity included in the job can be processed by the job worker instance 234, and an overall job result can be determined. In general, the overall job result can either indicate that an alert is to be triggered, or that no alert is to be triggered.

Figure 2D:
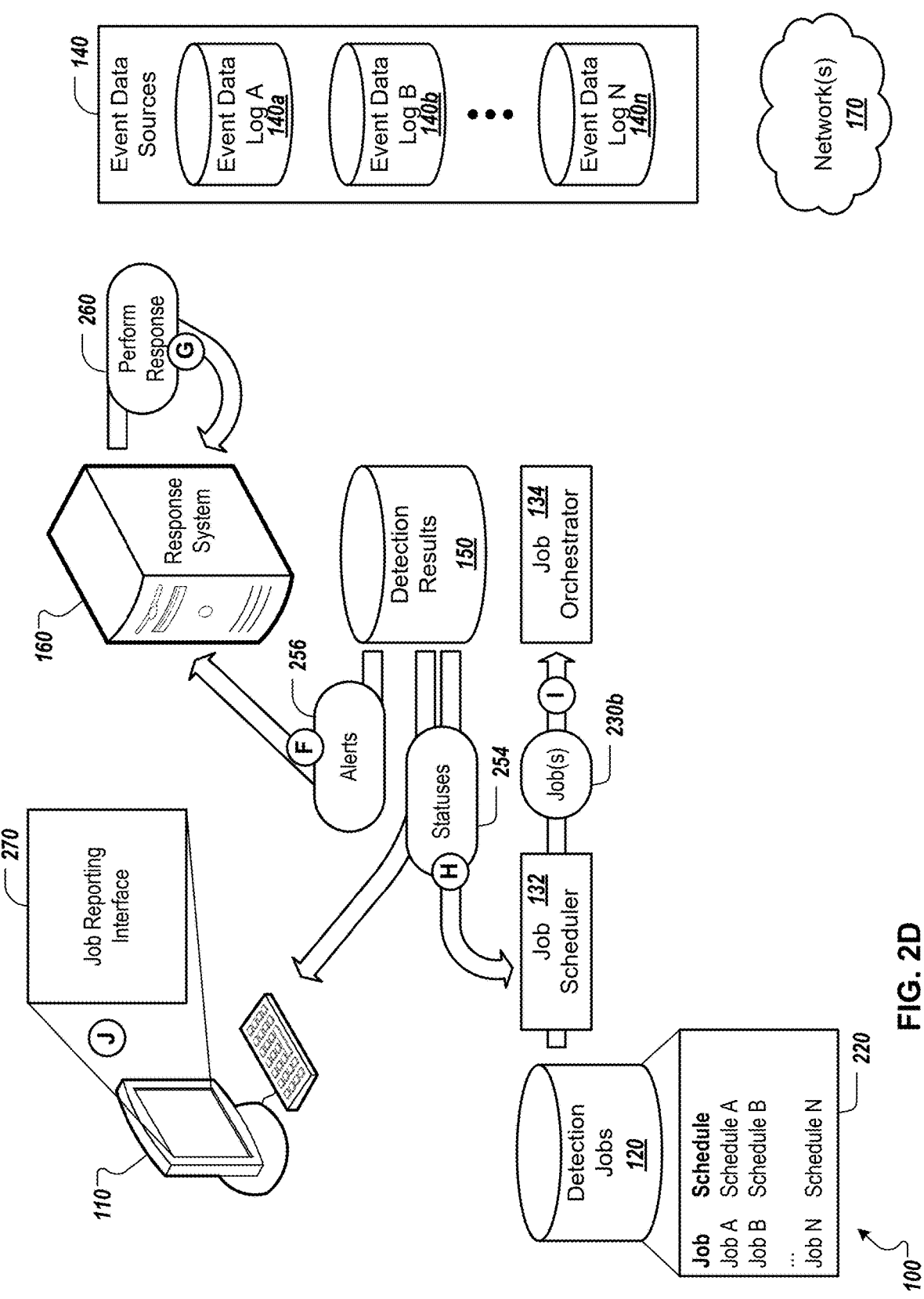

Referring now to FIG. 2D, the cybersecurity event detection results can be asynchronously consumed by various systems according to their processing directives. For example, results from various cybersecurity event detection jobs that are maintained by the detection results repository 150 can be provided to one or more response systems (e.g., response system 160) and to the job scheduler 132 of the detection system 130, which can independently operate on the detection results. The cybersecurity event detection results, for example, can be provided through polling mechanisms initiated by a system that consumes the results maintained by the detection results repository 150, through a push mechanism employed by the detection results repository 150, a publish/subscribe messaging architecture, or another suitable data transmission mechanism.

During stage (F), alerts 256 maintained by the detection results repository 150 (e.g., in a cybersecurity investigation result portion of the repository 150, which can alternately be included in a separate repository) can be accessed by the response system 160. In response to detecting an alert, during stage (G), the response system 160 can perform one or more response actions 260. For example, the alert(s) 256 can include an indication (e.g., an identifier, a description, etc.) of a cybersecurity event that has occurred, an indication of a date/time at which the cybersecurity event has occurred (e.g., including a start time and an end time of event log data that revealed the cybersecurity event), and other relevant details that pertain to a cybersecurity event. The response actions 260, for example, can include mitigation actions such as blocking network traffic, performing malware removal operations, notifying system users and operators about the alert 256, and other appropriate response actions.

During stage (H), statuses 254 maintained by the detection results repository 150 (e.g., in an event detection status portion of the repository 150, which can alternately be included in a separate repository) can be accessed by the job scheduler 132 of the detection system 130. For example, the statuses 254 can include an indication of which cybersecurity event detection jobs are still in progress, which ones were successful, and which ones have failed. As previously described with respect to FIG. 2B and stage (C), for example, the job scheduler 132 can adaptively select one or more additional detection jobs (e.g., job(s) 230*b*) from the set 220 of defined detection jobs, based at least in part on the statuses 254 (e.g., derived from job execution log data) of in progress, successful, and failed jobs. If a job is currently in progress, for example, the job scheduler 132 can wait until the job is either successful or fails before scheduling another instance of the job. As another example, if a job were to be successful, the job scheduler 132 can select the job for another execution, over an updated (and more recent) time window when the job is again due for execution. As another example, if a job has failed, the job scheduler 132 can select the job for another execution, over a same time window, and can optionally provide an operator notification of the job failure.

During stage (J), a job reporting interface 270 can be presented that includes information related to sequential runs of a cybersecurity event detection job over time (e.g., according to a job execution log). Referring now to FIG. 4, an example execution log 400 that results from detecting cybersecurity-related events is shown. As shown in the present example, the execution log 400 includes a log entry 402 of a first run of "Job A" which indicates a start time and end time over which event data log records were analyzed (according to the record timestamps) for performing the job run. According to the log entry 402 of the first run, for example, the job is complete and an alert was triggered by the job. Continuing with the present example, the execution log 400 also includes a log entry 404 of a second run of "Job A" which also includes a corresponding start time and end time. According to the log entry 404 of the second run, for example, the job failed without raising any alerts. Continuing with the present example, the execution log 400 also includes a log entry 406 of a third run of "Job A" (also including start and end times), and an indication that the job is currently in progress. Other examples can include additional event detection job execution data, such as an amount of processing time for an overall job, an amount of processing time for activities included in the job, a number of retries that occurred, and other relevant information. In general, the job reporting interface 270 and the execution log 400 can provide visibility into event detection processes, and can be used by operators and by computing devices of the cybersecurity event detection platform to identify and rectify job execution issues.

Figure 5:
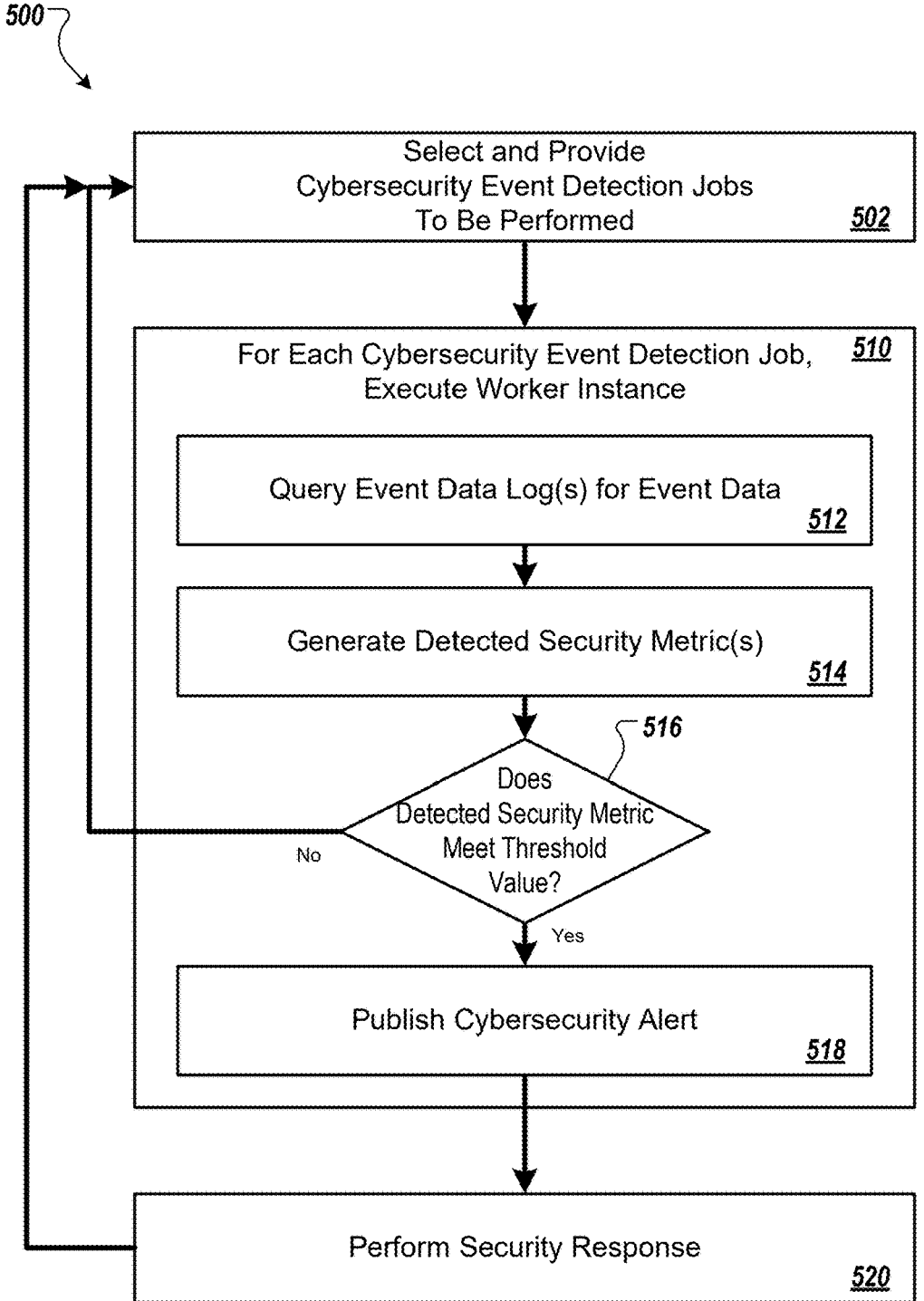
FIG. 5 is a flow diagram of an example technique for performing asynchronous detection of cybersecurity-related events.

FIG. 5 is a flow diagram of an example technique 500 for performing asynchronous detection of cybersecurity-related events. Operations included in the technique 500, for example, can be performed repeatedly and asynchronously according to the various processing directives of individual systems and individually defined cybersecurity event detection jobs. In the present example, the technique 500 can be performed by components of the system 100 (e.g., shown in FIG. 1) according to the stages (A) through (J) (e.g., shown in FIGS. 2A-2D), and will be described as such for clarity. However, the technique 500 can also be performed by other cybersecurity platforms and systems.

At 502, cybersecurity event detection jobs to be performed can be selected and provided. For example, during stage (C) (shown in FIG. 2B), the job scheduler 132 of the detection system 130 can select the job(s) 230*a* from the detection jobs repository 120 that are due to be performed during a specified time interval, according to job scheduling data associated with the jobs, and based at least in part on job execution log data associated with possible previous performances of the job (e.g., over historical time windows that have been used to retrieve and process event log data). The job(s) 230*a*, for example, can be provided by the job scheduler 132 to the job orchestrator 134 of the detection system 130.

At 510, for each selected and provided cybersecurity event detection job, a worker instance can be executed. For example, during stage (D) (shown in FIG. 2C), the job orchestrator 134 can provide one of the job(s) 230*a* to the job worker instance 234 for execution. The job worker instance 234, for example, can execute the event detection job according to job instruction data that is associated with the job. While the event detection job is being performed, for example, the job worker instance can update job state data 236 that tracks and persists information related to a current state of the job, to facilitate a recovery and possible retry in the event of an execution and/or communication failure. Relatively simple detection jobs, for example, can involve a single activity that is performed by an activity worker that is configured to access data from a single event data log, whereas more complicated detection jobs can involve multiple activities that are performed by multiple activity workers that are configured to access data from respective different event data logs.

At 512, one or more event data logs can be queried for event data. For example, activity workers A1, A2, and A3 (shown in FIG. 2C) can be configured to query respective event data logs 140*a*, 140*b*, and 140*n*, for event data that has occurred over a specified time range (e.g., with the query including a start time and an end time that is separated by a time interval). In general, an end time of a specified time range can be relatively close to a current time at which a detection job is being performed, however in some situations, a time range can be specified in which less recent event data is queried. For situations in which a detection job includes multiple different activities, each of the activities be performed on event data associated with a same specified time range, or with different specified time ranges.

At 514, detected security metrics can be generated. For example, security metrics can be generated by each of the one or more activity workers that are used to perform an overall detection job. For situations in which a detection job includes multiple different activities, component security metrics can be generated by the activity workers for each of the activities, and a composite security metric can be generated by the overall detection job, by performing one or more data operations that receive the component security metrics as input.

At 516, a determination can be performed of whether the detected security metric meets a threshold value (or falls within a range of values). For example, the job worker instance 234 can perform a determination of whether the detected security metric meets a threshold value (or a range of values) for triggering an alert, which had been previously specified when the detection job was defined. If the detected security metric does not meet the threshold value, the process 500 can continue and additional cybersecurity event detection jobs can be selected and provided for performance (at 502). If the detected security metric meets the threshold value, however, a cybersecurity alert can be published (at 518). For example, during stage $E_2$ (shown in FIG. 2C), the job orchestrator 134 can transmit the cybersecurity alert to the detection results repository 150 (e.g., in a cybersecurity investigation result portion of the repository 150, and/or a separate repository that is configured to handle specific types of alerts).

At 520, a security response can be performed. During stages (F) and (G) (shown in FIG. 2D), the response system 160 can determine that the alert has been triggered (e.g., by subscribing to the cybersecurity investigation result repository, by polling for alerts, by receiving alerts, etc.), and can perform a security response 260 according to its response logic. The actions of the security response 260, for example, can include mitigation actions such as blocking network traffic, performing virus removal operations, notifying system users and operators about the alert 256, and other appropriate response actions. In some implementations, security response actions can be automated or semi-automated, in that the actions can be performed without any direct input from a system operator under predefined conditions.

By asynchronously performing event detection and security response operations, for example, components of the cybersecurity event detection platform can be loosely coupled, thus improving system robustness and recovery from possible crashes and network outages. Further, recent event log data from multiple disparate sources can be queried and analyzed on an ad hoc basis (as opposed to explicitly tracking and compiling event counts as they occur), thus reducing system complexity and memory usage. Moreover, the security response actions can also be performed in a flexible manner, on an ad hoc basis.

Figure 6:
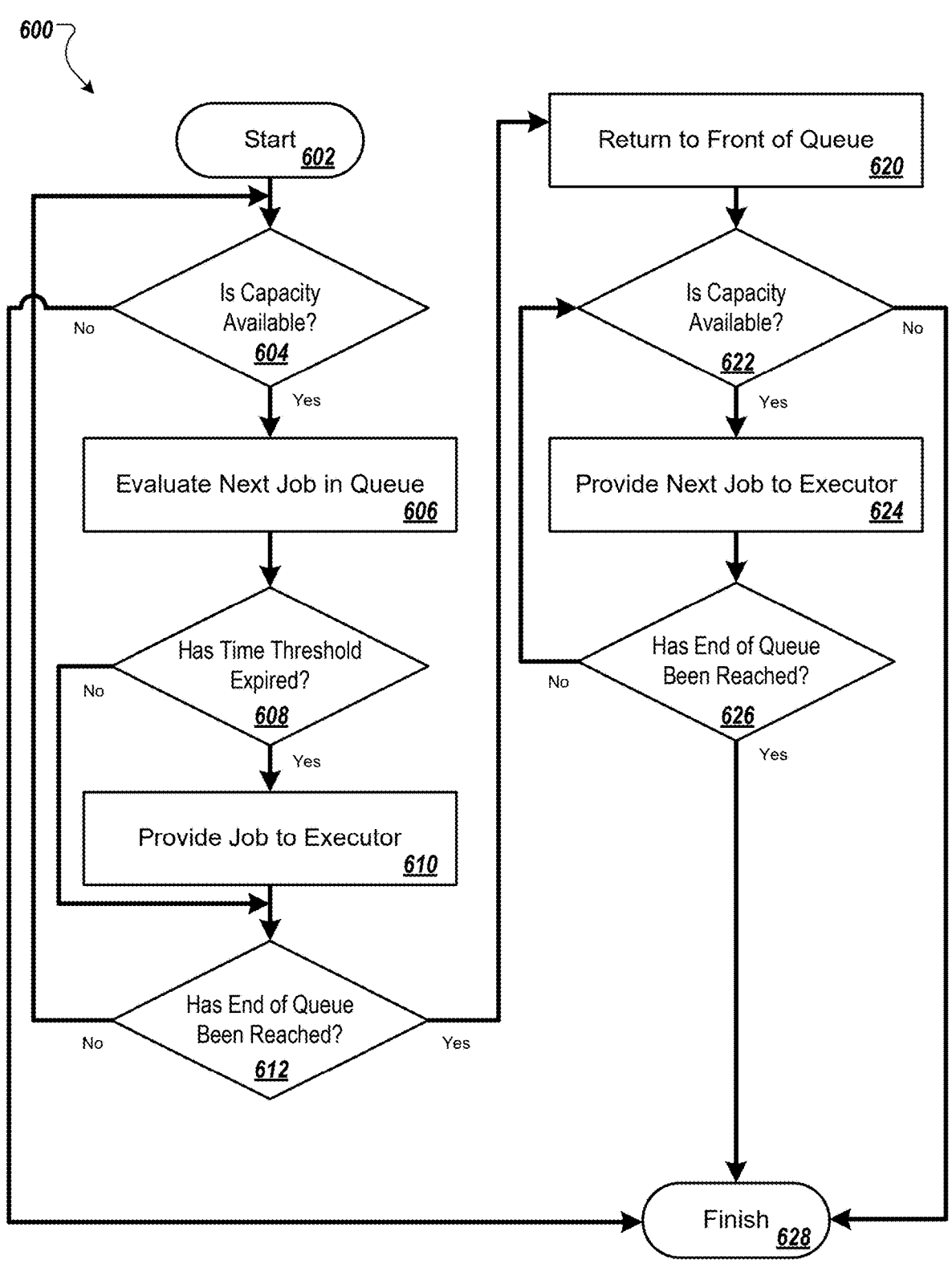
FIG. 6 is a flow diagram of an example technique for selecting cybersecurity event detection jobs for execution.

FIG. 6 is a flow diagram of an example technique 600 for selecting cybersecurity event detection jobs for execution. Operations of the technique 600, for example, can be performed over a rotating queue of cybersecurity event detection jobs, in which the jobs are generally selected in a first in, first out arrangement (that can optionally be selectively overridden based on scheduling frequency values specified for the jobs in the rotating queue). When a cybersecurity event detection job is completed, for example, the job can be placed at the end of the rotating queue. The job can then progressively move towards the front (or top) of the queue as other jobs are selected, until such time that another selection of the job occurs.

The example technique 600 can be employed as a flexible scheduling approach (e.g., as generally described with respect to stage (C) of FIG. 2B), in which specified job frequency values are employed by the cybersecurity event detection system as minimum scheduling guidelines, with a job potentially being executed more frequently than indicated by the specified job frequency value when the system has available capacity. Operations and flow of the example technique 600 are described here with respect to FIG. 6, and will also be described in further detail below with respect to an example scenario of FIGS. 7A-7F. In the present example, the technique 600 can be performed by components of the system 100 (shown in FIG. 1), and will be described as such for clarity. However, the technique 600 can also be performed by other cybersecurity platforms and systems.

At 602, the example technique 600 can start. For example, the job scheduler 132 can periodically (e.g., once per 15 seconds, once per 30 seconds, once per minute, or at another suitable time interval) initiate a process for determining whether capacity for executing additional cybersecurity event detection jobs is available, for evaluating a job queue to select a batch of jobs to be initiated during a current time interval, and for providing data corresponding to the selected batch of jobs to the job orchestrator 134 for execution.

At 604, the job scheduler 132 can determine whether capacity for executing additional cybersecurity event detection jobs is available. In some implementations, the capacity can be determined based on a target number of jobs that are to be concurrently executed over a time interval, adjusted by a number of jobs that are currently in the process of being executed. The target number of jobs (e.g., 100 jobs, 200 jobs, 500 jobs, 1000 jobs, or another suitable number of jobs) can be based on computer processing resources of the cybersecurity event detection system, for example, and can optionally be dynamically adjusted between time intervals, in response to an adjustment of available processing resources. For example, as additional processing resources come online, the target number of jobs can be increased, and as processing resources go offline, the target number of jobs can be decreased. If capacity for executing additional jobs is unavailable for the current time interval, the technique 600 can finish at 628, and can begin again at a next time interval.

If capacity for executing additional jobs is available for the current time interval, for example, at 606 the job scheduler 132 can evaluate the next cybersecurity event detection job in a queue of jobs. In general, each job in the queue of jobs can be associated with a frequency value that corresponds to a minimum frequency at which the job is to be executed (e.g., once every five minutes, once every ten minutes, once every twenty minutes, or another suitable frequency), and with a timestamp that indicates a last time at which the job was executed. Evaluating a cybersecurity event detection job, for example, can include comparing the timestamp to a current time, and determining whether an amount of time that has elapsed since the last time at which the job was executed meets or exceeds the job's frequency value.

At 608, if a time threshold for a next execution of the cybersecurity event detection job has expired (e.g., if the amount of time that has elapsed since the last time at which the job was executed meets or exceeds the job's frequency value), at 610 the job can be removed from the queue and can be added to a batch of jobs to be provided to a job executer (e.g., the job orchestrator 134) for execution. The technique 600 can then proceed to 612 to determine whether the end of the job queue has been reached. If the time threshold has not expired, however, the job scheduler 132 can proceed to 612 without removing the job from the queue or adding the job to the batch of jobs.

At 612, the job scheduler can determine whether the end of the job queue has been reached. If not, the technique 600 can proceed to 604, where another determination is performed of whether capacity for executing additional cybersecurity event detection jobs is available, and the technique 600 can continue processing the job queue as above. If the end of the job queue has been reached, however, at this point all jobs in the queue having expired time thresholds have been added to the batch of jobs to be provided to the executor, and the technique 600 can proceed to 620, where the job scheduler 132 can return to the front of the job queue. In general, the remaining jobs in the queue do not have expired time thresholds, and can be sequentially added to the batch of jobs to be provided to the job executor (e.g., the job orchestrator 134) for execution, as long as capacity remains available.

At 622, the job scheduler 132 can again determine whether capacity for executing additional cybersecurity event detection jobs is available (e.g., by determining whether a number of jobs currently being executed and a number of jobs included in a current batch of jobs to be provided to the job orchestrator 134 meets the target number of jobs). If capacity is for executing additional jobs is available for the current time interval, at 624 the job can be removed from the queue and can be added to the batch of jobs to be provided for execution. If capacity for executing additional jobs is unavailable for the current time interval, the technique 600 can finish at 628, and can begin again at a next time interval.

At 626, the job scheduler 132 can determine whether the end of the job queue has been reached. If the end of the job queue has not yet been reached, the technique 600 can proceed to 622, where another determination is performed of whether capacity for executing additional cybersecurity event detection jobs is available, and the technique 600 can continue adding jobs to the batch of jobs to be provided for execution as above, until capacity for additional jobs is no longer available. If the end of the job queue has been reached, the technique 600 can finish at 628.

Once the technique 600 has finished, the batch of cybersecurity event detection jobs that have been selected by the job scheduler 132 for the current time interval can be provided to the job orchestrator 134 for execution. At the beginning of the next time interval, for example, the job scheduler 132 can determine a number of jobs that remain in progress, can determine a target number of jobs that are to be concurrently executed over the next time interval, and can determine a capacity for additional jobs for the next time interval (e.g., by subtracting the number of in progress jobs from the target number of jobs). Using the technique 600, for example, a cybersecurity event detection system can fully use available processing resources, while ensuring that each cybersecurity event detection job is executed at least at its minimum specified frequency. Further, excess processing resources can be equitably distributed to remaining jobs such that the jobs can be executed at increased intervals when resources are available-thus, the detection of cybersecurity events can potentially be accelerated relative to a planned schedule.

FIGS. 7A-7F depict an example scenario for selecting and executing cybersecurity event detection jobs using a rotating queue. In general, the example scenario can involve the use of the example technique 600 (shown in FIG. 6) to periodically evaluate a rotating queue of cybersecurity event detection jobs, and a set of jobs that are currently being executed, over a series of time intervals. Upon completion of the evaluation, for example, a new batch of jobs can be selected (e.g., by the job scheduler 132) and provided (e.g., to the job orchestrator 134) for execution.

Referring to FIG. 7A, for example, at time 1:34, a job queue (here shown as job queue 700a) includes a set of jobs that are waiting for execution. Each job, for example, can be represented by a job identifier, and can be associated with a job frequency value that corresponds to a minimum frequency at which the job is to be executed, and with a timestamp that indicates a last time at which the job was executed. In the present example, Job D is at the front of the job queue 700a, and has a frequency value of 10 minutes and a timestamp of 1:30. Job E is second in the job queue 700a, and also has a frequency value of 10 minutes and a timestamp of 1:30. Job F is third in the job queue 700a, and also has a frequency value of 10 minutes and a timestamp of 1:30. The job queue 700a of the present example proceeds thusly, until Job O is reached at the end of the queue, with a frequency value of 20 minutes and a timestamp of 1:33. Further, at time 1:34, a set of executing jobs (here shown as executing jobs 710a) exists. In the present example, Job B and Job C are completed during the current time interval, and upon completion are each added to the end of the job queue 700a, along with respective timestamps that indicate the time at which the jobs have been completed (e.g., 1:34). Job A, however, remains in progress.

Referring to FIG. 7B, for example, at time 1:35, a new time interval for selecting and executing cybersecurity event detection jobs occurs. In the present example, the job scheduler 132 determines a target number of jobs (e.g., 3) that are to be concurrently executed over the time interval, and a number of in progress jobs (e.g., a single job, Job A). Thus, in the present example, two additional jobs can be provided for execution over the current time interval. The job scheduler 132, for example, can then evaluate the job queue (here shown as job queue 700b), moving from the front of the queue to the end, and sequentially selecting any jobs for which a time threshold for a next execution of the job has expired (e.g., based on the job's frequency value, a time at which the job was last executed, and the current time). In the present example, no jobs fall under such criteria, so the job scheduler 132 returns to the front of the job queue 700b, sequentially selects the first two jobs (e.g., Job D and Job E) to fill available job slots, and provides the jobs in a batch to the job orchestrator 134 for execution. Further, during the current time interval (e.g., at some time between 1:35:00 and 1:35:59), Job A and Job D of the set of executing jobs (here shown as executing jobs 710b) are each completed, and upon completion are each added to the end of the job queue 700b, along with respective timestamps that indicate the time at which the jobs have been completed (e.g., 1:35). Job E, however, remains in progress.

Referring to FIG. 7C, for example, at time 1:36, a new time interval for selecting and executing cybersecurity event detection jobs occurs. In the present example, the job scheduler 132 determines a target number of jobs (e.g., 3) that are to be concurrently executed over the time interval, and a number of in progress jobs (e.g., single job, Job E). Thus, in the present example, two additional jobs can be provided for execution over the current time interval. The job scheduler 132, for example, can then evaluate the job queue (here shown as job queue 700c), moving from the front of the queue to the end, and sequentially selecting any jobs for which a time threshold for a next execution of the job has expired. In the present example, Job H falls under that criteria, with a difference between the job's last execution time (e.g., 1:31) and the current time (1:36) meeting the job's frequency value (e.g., 5 minutes). Thus, in the present example, the job scheduler 132 can proceed to add Job H to a batch of jobs for execution. The job scheduler 132 can then return to the front of the job queue 700c, can sequentially select the first job (e.g., Job F) to fill the remaining job slot, and can provide the batch of jobs (e.g., including Job H and Job F) to the job orchestrator 134 for execution. Further, during the current time interval (e.g., at some time between 1:36:00 and 1:36:59), all of the set of executing jobs (here shown as executing jobs 710c, including in progress Job E and newly added Jobs H and F) are completed, and upon completion are each added to the end of the job queue 700*c*, along with respective timestamps that indicate the time at which the jobs have been completed (e.g., 1:36).

Referring to FIG. 7D, for example, at time 1:37, a new time interval for selecting and executing cybersecurity event detection jobs occurs. In the present example, the job scheduler 132 determines a target number of jobs (e.g., 3) that are to be concurrently executed over the time interval, and a number of in progress jobs (e.g., none, as the jobs were all completed during the previous time interval). Thus, in the present example, three jobs can be provided for execution during the current time interval. The job scheduler 132, for example, can then evaluate the job queue (here shown as job queue 700*d*), moving from the front of the queue to the end, and sequentially selecting any jobs for which a time threshold for a next execution of the job has expired. In the present example, Job K falls under that criteria, with a difference between the job's last execution time (e.g., 1:32) and the current time (e.g., 1:37) meeting the job's frequency value (e.g., 5 minutes). Thus, in the present example, the job scheduler 132 can add Job K to a batch of jobs for execution. The job scheduler 132 can then return to the front of the job queue 700*d*, can sequentially select the first two jobs (e.g., Job G and Job I) to fill the remaining two job slots, and can provide the batch of jobs (e.g., including Job K, Job G, and Job I) to the job orchestrator 134 for execution. Further, during the current time interval (e.g., at some time between 1:37:00 and 1:37:59), Job K in the set of executing jobs (here shown as executing jobs 710*d*, including all of the newly added jobs K, G, and I) is completed, and upon completion is added to the end of the job queue 700*d*, along with a timestamp that indicates the time at which the job has been completed (e.g., 1:37). Job G and Job I, however remain in progress.

Figures 7E, 7F:
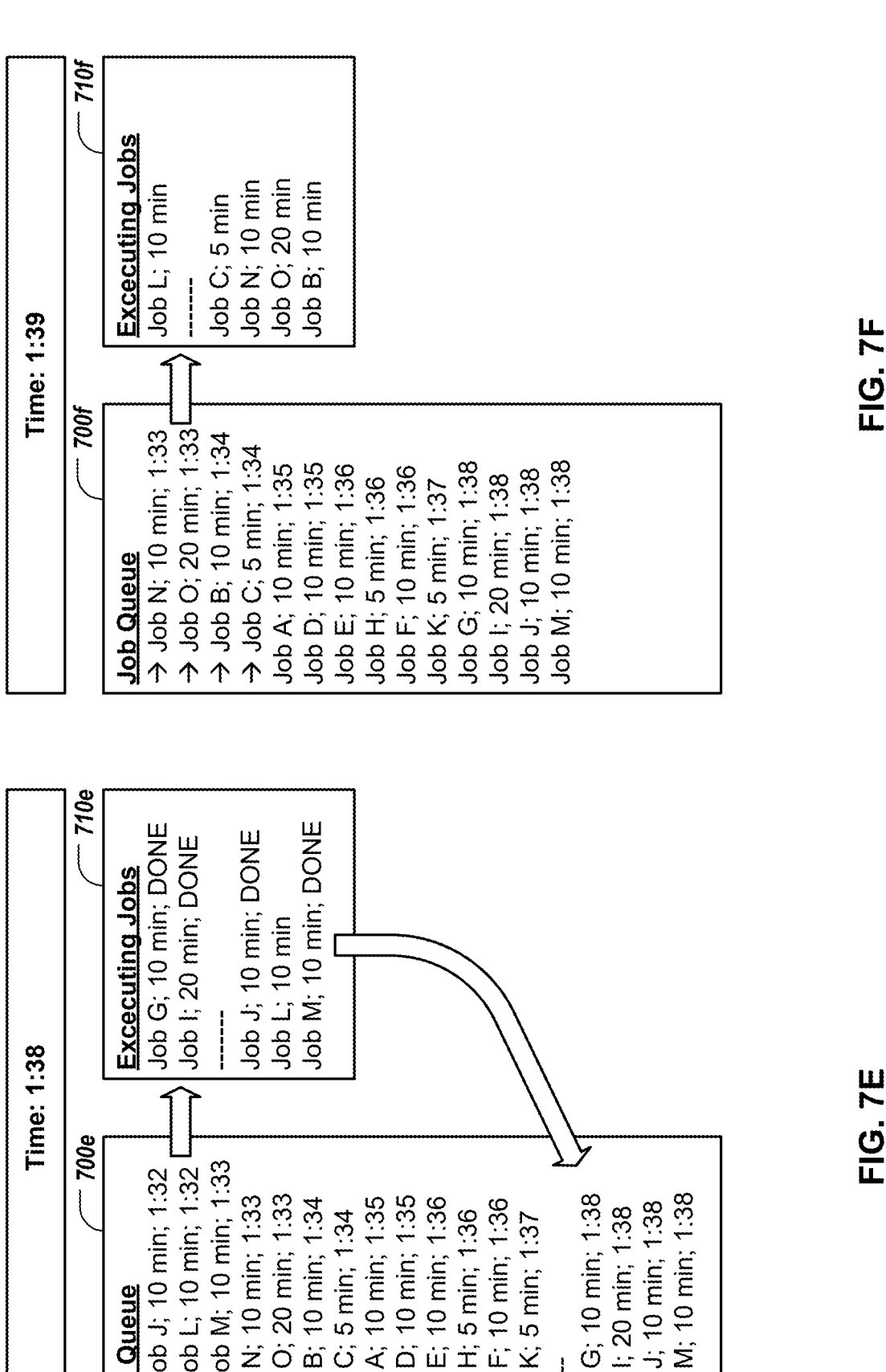

Referring to FIG. 7E, for example, at time 1:38, a new time interval for selecting and executing cybersecurity event detection jobs occurs. In the present example, the job scheduler 132 determines a target number of jobs (e.g., 5, an increase over the target number of the jobs for the previous time interval) that are to be concurrently executed over the time interval, and a number of in progress jobs (e.g., Job G and Job I). Thus, in the present example, three additional jobs can be provided for execution during the current time interval. The job scheduler 132, for example, can then evaluate the job queue (here shown as queue 700*e*), moving from the front of the queue to the end, and sequentially selecting any jobs for which a time threshold for a next execution of the job has expired. In the present example, no jobs fall under such criteria, so the job scheduler 132 returns to the front of the job queue 700*e*, sequentially selects the first three jobs (e.g., Job J, Job L, and Job M) to fill available job slots, and provides the jobs in a batch to the job orchestrator 134 for execution. Further, during the current time interval (e.g., at some time between 1:38:00 and 1:38:59), Jobs G, I, J, and M of the set of executing jobs (here shown as executing jobs 710*e*) are each completed, and upon completion are each added to the end of the job queue 700*e*, along with respective timestamps that indicate the time at which the jobs have been completed (e.g., 1:38). Job L, however, remains in progress.

Notably, the target number of jobs for the new time interval has increased relative to the previous time interval in the present example. The increase in the target number of jobs, for example, can be triggered in response to various conditions of the cybersecurity event detection system, such as a threshold number of in progress jobs being reached, occurrences of jobs having been selected out of sequence because of expired time thresholds, or other conditions that indicate that additional computing resources would be advantageous for processing the rotating queue of cybersecurity event detection jobs. The increase in the target number of jobs, for example, can reflect a corresponding increase in available computing resources. Similarly, a decrease in a target number of jobs can be triggered in response to conditions that indicate that additional computing resources may be superfluous (e.g., jobs regularly being processed more frequently than at their specified job frequency), thus freeing computing resources for use by other systems.

Referring to FIG. 7F, for example, at time 1:39, a new time interval for selecting and executing cybersecurity event detection jobs occurs. In the present example, the job scheduler 132 determines a target number of jobs (e.g., 5) that are to be concurrently executed over the time interval, and a number of in progress jobs (e.g., a single job, Job L). Thus, in the present example, four additional jobs can be provided for execution over the current time interval. The job scheduler 132, for example, can then evaluate the job queue (here shown as job queue 700*f*), moving from the front of the queue to the end, and sequentially selecting any jobs for which a time threshold for a next execution has expired. In the present example, Job C falls under that criteria, with a difference between the job's last execution time (e.g., 1:34) and the current time (e.g., 1:39) meeting the job's frequency value (e.g., 5 minutes). Thus, in the present example, the job scheduler 132 can proceed to add Job C to a batch of jobs for execution. The job scheduler 132 can then return to the front of the job queue 700*c*, can sequentially select the next three jobs (e.g., Job N, Job O, and Job B) to fill the remaining three job slots, and can provide the batch of jobs (e.g., including Jobs C, N, O, and B) to the job orchestrator 134 for execution. Thus, in the present example, a rotation of the job queue has been completed.

Figure 8:
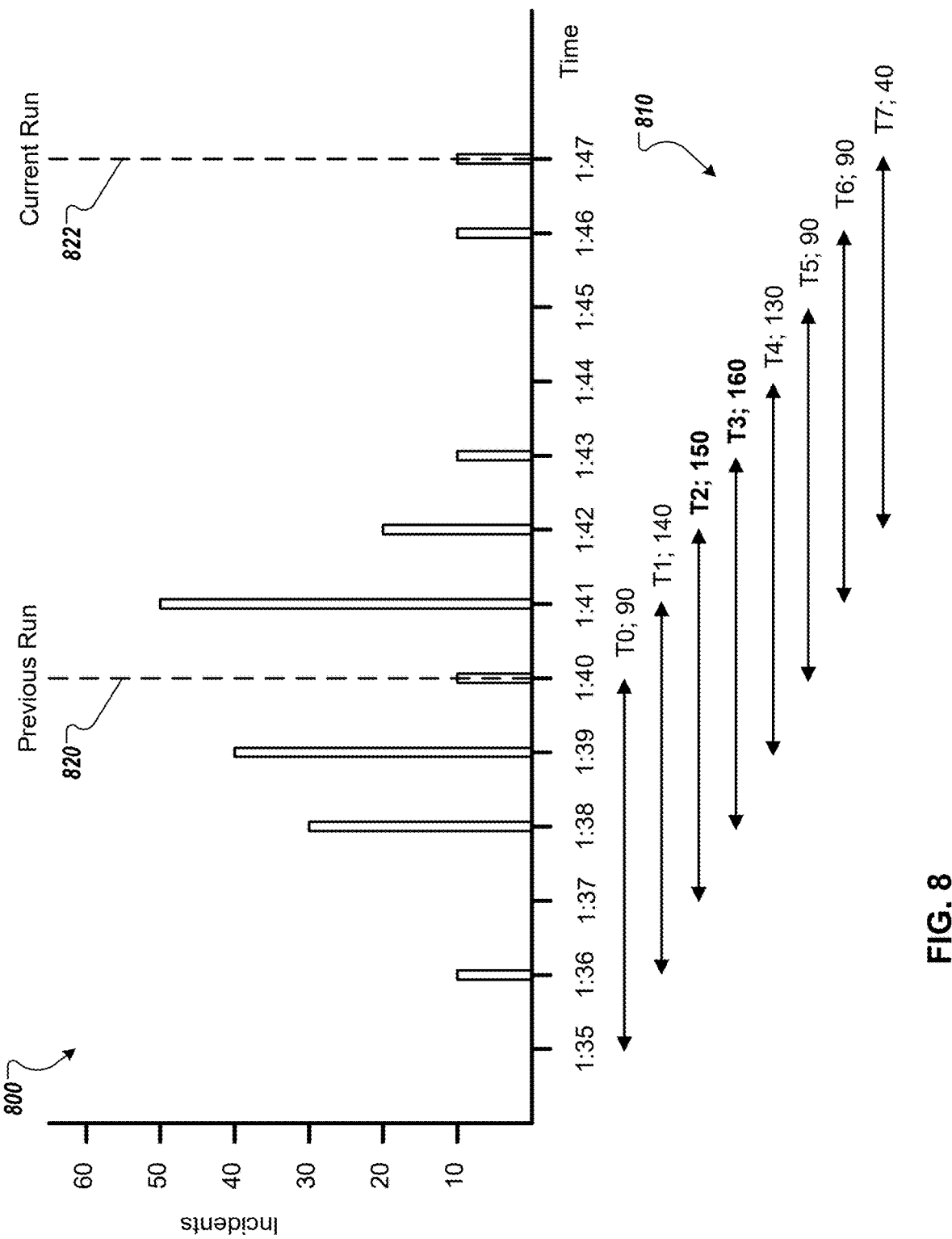
FIG. 8 depicts an example of aggregating data from an event data log using a series of sliding windows.

FIG. 8 depicts an example of aggregating data from an event data log using a series of sliding windows. In general, and as described in examples above with respect to the example interface of FIG. 3, a cybersecurity event detection job can involve a retrieval of query results from an event data log over a specified time interval. For jobs that are configured to detect an occurrence of a cybersecurity event based on a metric aggregation or frequency operation over the specified time interval, for example, it may be possible for the event to remain undetected when a data spike occurs around the time at which the job is executed. To mitigate such scenarios, for example, event data can be queried such that at least a portion of the data returned for a current cybersecurity event detection job can overlap with the data returned for a previous job. Once the data has been returned, for example, a series of sliding windows can be applied over the returned data such that the metric aggregation or frequency operation can detect a cybersecurity event that occurred at any point within a time range represented in the returned data, including at a time that is near the time of the previous job's execution.

As shown in FIG. 8, a graph 800 represents data from an event data log, in which incidents (e.g., related to network traffic, purchases, sensor detections, or other types of event occurrences) are tracked over time, and a series of time windows 810 that are applied over returned data from the event data log. In the present example, there were zero incidents at 1:35, there were ten incidents at 1:36, there were zero incidents at 1:37, there were thirty incidents at 1:38, there were forty incidents at 1:39, and so forth, until a current time of 1:47. A particular cybersecurity event detection job, for example, can be configured to aggregate incidents over a specified time interval (e.g., 5 minutes), and a cybersecurity event alert can be triggered when an aggregated count of the incidents over a time interval meets or exceeds a threshold value (e.g., 150 incidents over a five minute interval).

In the present example, a previous run 820 of the cybersecurity event detection job occurred at time 1:40. During the previous run, for example, a time window T0 of the time windows 810 (e.g., corresponding to a five minute interval between 1:35 and 1:40) had been applied to the returned event data, and an aggregation of the data had been performed, which resulted in a detection of ninety total incidents over the time window T0. Thus, in the present example, a cybersecurity event alert was not triggered, even though incidents had begun to spike at the 1:38 mark.

Continuing the present example, a current run 822 of the cybersecurity event detection job occurs at 1:47, and a time range can be determined for executing a query over the event data log. In some implementations, a start time of a time range for executing a query over an event data log can precede a previous run of a cybersecurity event detection job by an amount of time that corresponds to a time interval for the job, and an end time of the time range can be a current time. In the present example, since an aggregation of event data has already been performed at time window T0 during the previous run 822, the start time of the time range can be a time that matches the beginning of a next time window to be applied and that was not applied during the previous run (e.g., T1, or 1:36), and the end time can be the time of the current run (e.g., the current time of 1:47).

Once the event log data has been returned for the selected time range for the current run 822 of the cybersecurity event detection job, for example, the series of time windows 810 (e.g., time windows T1-T7) can each be applied to returned data for each possible time interval within the time range. In the present example, time window T1 (e.g., corresponding to a five minute interval between 1:36 and 1:41) can be applied to the returned event data and an aggregation of the data can be performed, which results in a detection of one hundred and forty total incidents over the time window T1.

Similarly, time window T2 (e.g., corresponding to a five minute interval between 1:37 and 1:42) can be applied to the returned event data and an aggregation of the data can be performed, which results in a detection of one hundred and fifty total incidents over the time window T2—thus triggering a cybersecurity event alert that has been specified for the cybersecurity event detection job. Further, in the present example, time windows T3-T7 can be applied to the returned event data, which results in another triggering of the cybersecurity event alert for T3 (e.g., resulting in a detection of one hundred and sixty total incidents). Notably, the cybersecurity event of the present example would not have been detected had the selected time range for the present cybersecurity event detection job not overlapped at least in part with a selected time range for a previous job, or if sliding time windows had not been applied.

Figure 9:
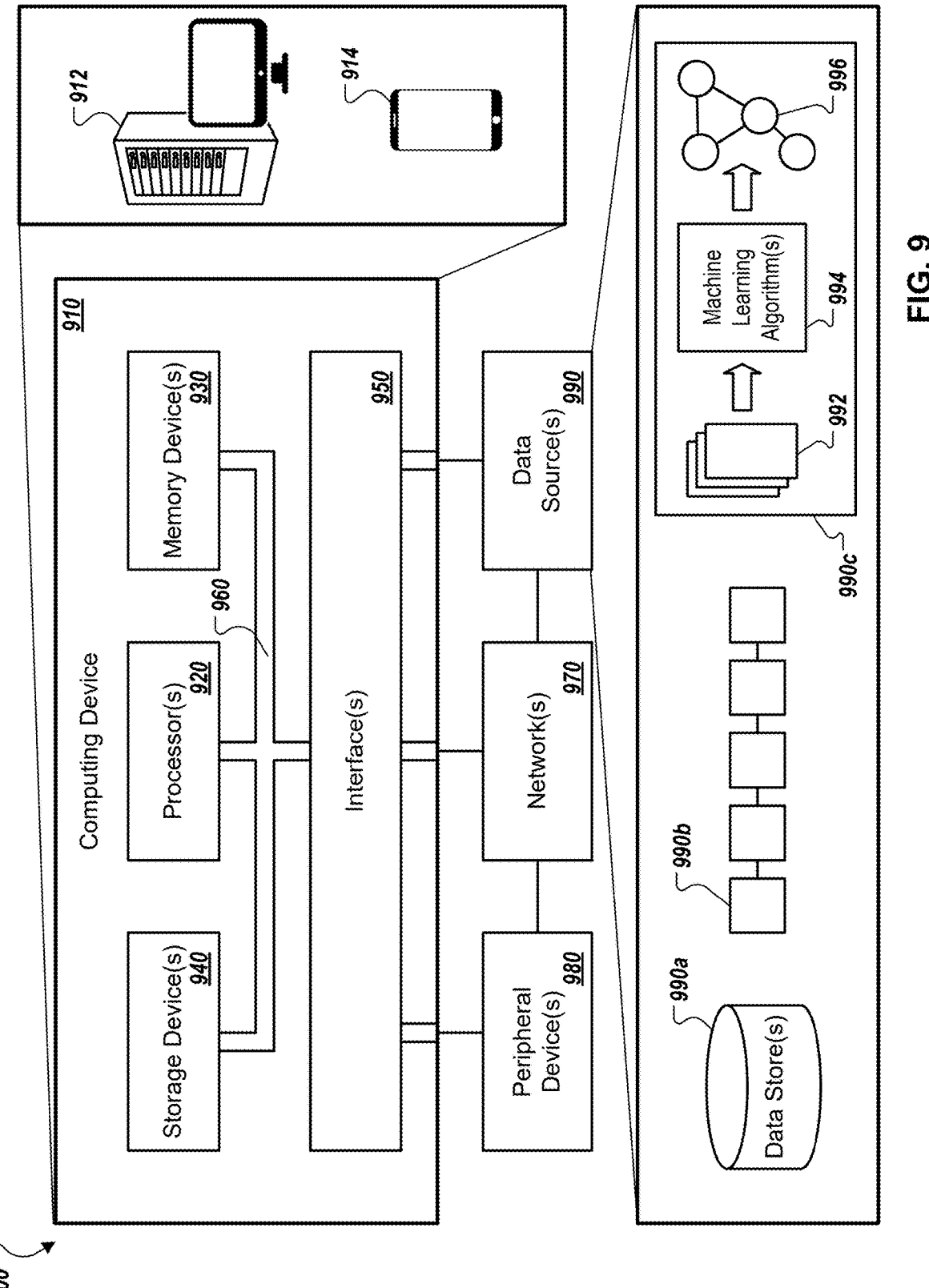
FIG. 9 is a schematic diagram that shows an example of a computing system.

FIG. 9 is a schematic diagram that shows an example of a computing system 900 that can be used to implement the techniques described herein. The computing system 900 includes one or more computing devices (e.g., computing device 910), which can be in wired and/or wireless communication with various peripheral device(s) 980, data source(s) 990, and/or other computing devices (e.g., over network(s) 970). The computing device 910 can represent various forms of stationary computers 912 (e.g., workstations, kiosks, servers, mainframes, edge computing devices, quantum computers, etc.) and mobile computers 914 (e.g., laptops, tablets, mobile phones, personal digital assistants, wearable devices, etc.). In some implementations, the computing device 910 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 910, and an entire system can be made up of multiple devices communicating with each other. For example, the computing device 910 can be part of a computing system that includes a network of computing devices, such as a cloud-based computing system, a computing system in an internal network, or a computing system in another sort of shared network. Processors of the computing device (910) and other computing devices of a computing system can be optimized for different types of operations, secure computing tasks, etc. The components shown herein, and their functions, are meant to be examples, and are not meant to limit implementations of the technology described and/or claimed in this document.

The computing device 910 includes processor(s) 920, memory device(s) 930, storage device(s) 940, and interface(s) 950. Each of the processor(s) 920, the memory device(s) 930, the storage device(s) 940, and the interface(s) 950 are interconnected using a system bus 960. The processor(s) 920 are capable of processing instructions for execution within the computing device 910, and can include one or more single-threaded and/or multi-threaded processors. The processor(s) 920 are capable of processing instructions stored in the memory device(s) 930 and/or on the storage device(s) 940. The memory device(s) 930 can store data within the computing device 910, and can include one or more computer-readable media, volatile memory units, and/or non-volatile memory units. The storage device(s) 940 can provide mass storage for the computing device 910, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 950 can include various communications interfaces (e.g., USB, Near-Field Communication (NFC), Bluetooth, WiFi, Ethernet, wireless Ethernet, etc.) that can be coupled to the network(s) 970, peripheral device(s) 980, and/or data source(s) 990 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 950 can include a control interface that receives commands from an input device (e.g., operated by a user) and converts the commands for submission to the processors 920. The interface(s) 950 can include a display interface that includes circuitry for driving a display to present visual information to a user. The interface(s) 950 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 970 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 910 can communicate with the peripheral device(s) 980, the data source(s) 990, and/or other computing devices over the network(s) 970. In some implementations, the computing device 910 can directly communicate with the peripheral device(s) 980, the data source(s), and/or other computing devices.

The peripheral device(s) 980 can provide input/output operations for the computing device 910. Input devices (e.g., keyboards, pointing devices, touchscreens, microphones, cameras, scanners, sensors, etc.) can provide input to the computing device 910 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 910 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 990 can provide data for use by the computing device 910, and/or can maintain data that has been generated by the computing device 910 and/or other devices (e.g., data collected from sensor devices, data aggregated from various different data repositories, etc.). In some implementations, one or more data sources can be hosted by the computing device 910 (e.g., using the storage device(s) 940). In some implementations, one or more data sources can be hosted by a different computing device. Data can be provided by the data source(s) 990 in response to a request for data from the computing device 910 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 990*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 990*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 990*c*. The machine learning system(s) 990*c*, for example, can be used to analyze data from various sources (e.g., data provided by the computing device 910, data from the data store(s) 990*a*, data from the blockchain(s) 990*b*, and/or data from other data sources), to identify patterns in the data, and to draw inferences from the data patterns. In general, training data 992 can be provided to one or more machine learning algorithms 994, and the machine learning algorithm(s) can generate a machine learning model 996. Execution of the machine learning algorithm(s) can be performed by the computing device 910, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks. With respect to the technology described herein, the training data can include data that represents cybersecurity event data that is collected by various event data logs. The machine learning model that results from the machine learning algorithm(s) can be used to associate combinations of event data across the various event data logs with particular types of cybersecurity events. Use of the machine learning model can provide the benefit of automated or semi-automated discovery of event patterns to facilitate the definition of cybersecurity event detection jobs for detecting when such event patterns occur over time.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer-or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer method for asynchronously performing and monitoring cybersecurity investigations, comprising:

selecting, by a scheduler and from a repository of cybersecurity event detection jobs, one or more selected event detection jobs to be performed during a specified time interval;

providing, by the scheduler and to an orchestrator, the one or more selected event detection jobs;

for each event detection job of the one or more event selected detection jobs, executing, by the orchestrator, a corresponding event detection job worker instance for performing the event detection job during the specified time interval, wherein performing the event detection job comprises:

querying at least one event data log for event data that represents events that have occurred over a specified time range;

processing the event data that results from the querying of the at least one event data log to generate a detected security metric;

comparing the detected security metric to a threshold security metric value; and in response to the detected security metric meeting the threshold security metric value, publishing a cybersecurity alert to a cybersecurity investigation result repository;

subscribing, by a response system, to the cybersecurity investigation result repository, to identify cybersecurity alerts that have been published to the cybersecurity investigation result repository; and in response to the identifying of the cybersecurity alert that has been published to the cybersecurity investigation result repository, performing, by the response system, a security response.

2. The computer-implemented method of claim 1, further comprising continually appending event data to the at least one event data log, in response to events that occur over time.

3. The computer-implemented method of claim 1, further comprising:

providing an operator interface for specifying instructions for performing the event detection job;

receiving, through the operator interface, a specification of the instructions for performing the event detection job; and providing job definition data that includes the specification of the instructions for performing the event detection job, for storage by the repository of cybersecurity event detection jobs.

4. The computer-implemented method of claim 3, wherein the job definition data is configured for processing a specific type of data from a specific event data log during performance of the event detection job, according to the specification of the instructions for performing the event detection job.

5. The computer-implemented method of claim 3, wherein the job definition data includes job scheduling data that is configured for determining when to select and provide the event detection job to the orchestrator.

6. The computer-implemented method of claim 5, wherein the job scheduling data includes a frequency parameter, and wherein the event detection job is selected by the scheduler and provided to the orchestrator for another performance of the event detection job when a difference between a current time and a time at which a last performance of the event detection job occurred meets or exceeds the frequency parameter.

7. The computer-implemented method of claim 1, further comprising:

while the event detection job is being performed by the event detection job worker instance, receiving, by the orchestrator, current state information that indicates a current state of the event detection job;

storing the current state information for the event detection job, in an event detection status repository; and accessing, by the scheduler and from the event detection results repository, the current state information for the event detection job, for determining whether to select the event detection job for another performance of the event detection job.

8. The computer-implemented method of claim 7, further comprising:

when the current state information indicates that the event detection job has failed, selecting, by the scheduler, the event detection job for another performance of the event detection job, over event data log data having timestamp values in a same time window as for a previous performance of the event detection job.

9. The computer-implemented method of claim 7, further comprising:

when the current state information indicates that the event detection job has successfully completed, selecting, by the scheduler, the event detection job for another performance of the event detection job, over a time window that has a start time that precedes an end of time of the previous performance of the event detection job by a specified amount of time, such that the time window for the previous performance of the event detection job and a time window for the current performance of the event detection job partially overlap.

10. The computer-implemented method of claim 7, further comprising:

when the current state information indicates that the event detection job has successfully completed, adding the event detection job to the end of a rotating queue of cybersecurity event detection jobs;

wherein selecting one or more selected event detection jobs includes (i) selecting the one or more selected event detection jobs from the front of the rotating queue of cybersecurity event detection jobs, and (ii) adding the one or more selected event detection jobs to a batch of event detection jobs; and wherein providing the one or more selected event detection jobs includes providing the batch of event detection jobs.

11. The computer-implemented method of claim 1, wherein comparing the detected security metric to the threshold security metric includes aggregating the event data that results from querying the at least one event data log over a series of time windows, with each time window in the series of time windows having a same time interval within the specified time range.

12. The computer-implemented method of claim 1, wherein the event detection job includes a plurality of different activities, each activity involving a querying of a different event data log by a different activity worker to determine a respective activity result, and wherein the event detection job worker instance processes the respective activity results to generate the detected security metric.

13. A computer system for asynchronously performing and monitoring cybersecurity investigations, comprising:

one or more data processing apparatuses including one or more processors, memory, and storage devices storing instructions that, when executed, cause the one or more processors to perform operations comprising:

selecting, by a scheduler and from a repository of cybersecurity event detection jobs, one or more selected event detection jobs to be performed during a specified time interval;

providing, by the scheduler and to an orchestrator, the one or more selected event detection jobs;

for each event detection job of the one or more selected event detection jobs, executing, by the orchestrator, a corresponding event detection job worker instance for performing the event detection job during the specified time interval, wherein performing the event detection job comprises:

querying at least one event data log for event data that represents events that have occurred over a specified time range;

processing the event data that results from the querying of the at least one event data log to generate a detected security metric;

comparing the detected security metric to a threshold security metric value; and in response to the detected security metric meeting the threshold security metric value, publishing a cybersecurity alert to a cybersecurity investigation result repository;

subscribing, by a response system, to the cybersecurity investigation result repository, to identify cybersecurity alerts that have been published to the cybersecurity investigation result repository; and in response to the identifying of the cybersecurity alert that has been published to the cybersecurity investigation result repository, performing, by the response system, a security response.

14. The computer system of claim 13, the operations further comprising continually appending event data to the at least one event data log, in response to events that occur over time.

15. The computer system of claim 13, the operations further comprising:

providing an operator interface for specifying instructions for performing the event detection job;

receiving, through the operator interface, a specification of the instructions for performing the event detection job; and providing job definition data that includes the specification of the instructions for performing the event detection job, for storage by the repository of cybersecurity event detection jobs.

16. The computer system of claim 13, the operations further comprising:

while the event detection job is being performed by the event detection job worker instance, receiving, by the orchestrator, current state information that indicates a current state of the event detection job;

storing the current state information for the event detection job, in an event detection status repository; and accessing, by the scheduler and from the event detection results repository, the current state information for the event detection job, for determining whether to select the event detection job for another performance of the event detection job.

17. The computer system of claim 13, wherein comparing the detected security metric to the threshold security metric includes aggregating the event data that results from querying the at least one event data log over a series of time windows, with each time window in the series of time windows having a same time interval within the specified time range.

18. The computer system of claim 13, wherein the event detection job includes a plurality of different activities, each activity involving a querying of a different event data log by a different activity worker to determine a respective activity result, and wherein the event detection job worker instance processes the respective activity results to generate the detected security metric.

\*   \*   \*   \*   \*